United States Patent
Bharatia et al.

(10) Patent No.: US 10,168,421 B1
(45) Date of Patent: Jan. 1, 2019

(54) WEIGHT-LOADED TARGET CARRIER FOR LASER TRACKING

(71) Applicants: Pinkesh D. Bharatia, Cherry Hill, NJ (US); Robert J. Santoro, Cherry Hill, NJ (US); Nicholas R. Cifelli, Bloomington, IN (US); Scott A. Storms, Woolwich Township, NJ (US); Patrick J. Violante, Voorhees, NJ (US)

(72) Inventors: Pinkesh D. Bharatia, Cherry Hill, NJ (US); Robert J. Santoro, Cherry Hill, NJ (US); Nicholas R. Cifelli, Bloomington, IN (US); Scott A. Storms, Woolwich Township, NJ (US); Patrick J. Violante, Voorhees, NJ (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 93 days.

(21) Appl. No.: 15/492,926

(22) Filed: Apr. 20, 2017

(51) Int. Cl.
*G01S 17/66* (2006.01)
*G01S 17/88* (2006.01)
(Continued)

(52) U.S. Cl.
CPC .............. *G01S 7/481* (2013.01); *G01S 3/786* (2013.01); *G01S 17/66* (2013.01); *G02B 7/182* (2013.01); *G02B 5/12* (2013.01)

(58) Field of Classification Search
CPC ....... G01C 15/002; G01S 17/66; G01S 17/42; G01S 17/936; G01S 7/4813; G01S 17/02;
(Continued)

(56) References Cited

U.S. PATENT DOCUMENTS

| | | | |
|---|---|---|---|
| 4,621,926 A | * 11/1986 | Merry | G01B 11/005 33/503 |
| 7,230,689 B2 | 6/2007 | Lau | |

(Continued)

OTHER PUBLICATIONS

U.S. Appl. No. 15/492,894, filed Apr. 20, 2017, inventors Pinkesh D. Bharatia et al., invention entitled "Spring-Loaded Target Carrier for Laser Tracking".

*Primary Examiner* — Que T Le
(74) *Attorney, Agent, or Firm* — Howard Kaiser

(57) ABSTRACT

Exemplary practice of the present invention provides a carriage including a body having a void, a vertical rod passing through the void, four legs arranged rectangularly and projecting obliquely downward and outward from the body, and a vertical coil spring coaxially encompassing a lower portion of the vertical rod. The carriage is coupled with a retroreflective laser target at the bottom of the vertical rod whereby the top of the spring pushes against the bottom of the body and the bottom of the spring pushes against the top of the target. The target continuously adjusts in height so that the bottom of the target remains in constant spring-tension contact with the surface on which the carriage sits or travels, supported by its legs. The carriage is electromechanically propelled, and laser tracking is conducted to direct laser beams at and receive laser retroreflections from the target at various surface locations. According to some inventive embodiments, one or more weights are implemented, in lieu of or in addition to a spring, to exert a downward force upon the target.

20 Claims, 20 Drawing Sheets

(51) Int. Cl.
*G01S 7/481* (2006.01)
*G01S 3/786* (2006.01)
*G02B 7/182* (2006.01)
*G02B 5/12* (2006.01)

(58) Field of Classification Search
CPC ........ G01S 17/023; G01S 17/88; G01S 13/86; G01S 7/481; G02B 26/0875; G02B 26/10; G02B 26/101; G02B 5/122
USPC .......................................... 250/221, 239, 216
See application file for complete search history.

(56) References Cited

U.S. PATENT DOCUMENTS

| | | |
|---|---|---|
| 7,254,895 B1 | 8/2007 | O'Donnell |
| 8,902,408 B2 | 12/2014 | Bridges |
| 8,937,657 B2 | 1/2015 | Klass |
| 9,236,712 B2 | 1/2016 | McMurtry et al. |
| 9,541,232 B1 | 1/2017 | Santoro et al. |

* cited by examiner

WEIGHT-LOADED TARGET CARRIER FOR LASER TRACKING

STATEMENT OF GOVERNMENT INTEREST

The invention described herein may be manufactured and used by or for the Government of the United States of America for governmental purposes without payment of any royalties thereon or therefor.

CROSS-REFERENCE TO RELATED APPLICATIONS

This United States patent application is related to the United States patent application, hereby incorporated herein by reference and being filed concurrently herewith, entitled "Spring-Loaded Target Carrier for Laser Tracking," inventors Pinkesh D. Bharatia, Robert J. Santoro, and Nicholas R. Cifelli.

BACKGROUND OF THE INVENTION

The present invention relates to metrology, more particularly to utilization of retroreflective targets for effecting laser tracking.

"Metrology" is a broad term referring to the science and study of weights and measures and measurement. Three-dimensional geometries of objects are often measured using a coordinate measuring machine (CMM), which displays readings received from one or more probes. Numerous industries require precise measurements of three-dimensional shapes.

A kind of CMM known as a laser tracker is prevalent in military and industry. According to typical operation of a laser tracker, a retroreflective target is maintained in contact with an object. An oft-used type of retroreflective target is a spherically mounted retroreflector (SMR). A laser beam is emitted by the laser tracker and impinges upon the SMR, which reflects laser light back to the laser tracker along the original path from the laser tracker. The laser tracker includes an interferometer, which measures the distance from the laser tracker to the SMR based on laser light that re-enters the laser tracker. The laser beam is thus tracked by the laser tracker so as to measure mathematical/spatial coordinates (e.g. distance and two angles) that correspond to the location of the SMR.

A conventional approach to performing laser tracking with respect to a hollow cylindrical object involves placement of a spring-loaded touch probe to determine depth at a single point. The spring-loaded touch probe is then removed to record the data taken and is subsequently set up again, further down the bore of the object, for another measurement. Conventional methods, such as those implementing feeler gauges and micrometers, tend to be slow, tedious, inaccurate, and difficult to repeat without variances.

SUMMARY OF THE INVENTION

In view of the foregoing, it is an object of the present invention to provide a better methodology for taking multiple measurements using a laser tracker and a retroreflective target with respect to a cylindrical or other three-dimensional object.

The present invention provides for three basic modes of practice, each of which features, inter alia, exertion of a downward force. The first inventive mode of practice is characterized by downward force associated with a spring. The second inventive mode of practice is characterized by downward force associated with at least one weight. The third inventive mode of practice is characterized by downward force associated with a combination of a spring and at least one weight.

In accordance with exemplary practice of the present invention that involves spring-loading, a laser target assembly includes a generally rectangular member, four legs, a shaft, a coil spring, and a retroreflective target (such as a spherically mounted retroreflector). The generally rectangular member is characterized by four corners and a central aperture extending therethrough. Each of the four legs is connected to the generally rectangular member at a corner of the rectangular member. The shaft passes through the central aperture of the generally rectangular member. The retroreflective target is connected to the shaft at an axial end of the shaft. The coil spring circumscribes the shaft so as to exert respective tensile forces against the rectangular member and the retroreflective target. The laser target assembly is positionable upon a surface (such as an inner surface of a hollow cylinder) at each of plural locations of the surface whereby the legs and the retroreflective target are contiguous the surface. At each location of the surface upon which the retrorefective target is situate the retroreflective target is contiguous the surface in accordance with spring-loading associated with the coil spring. According to some inventive embodiments, an inventive laser tracking system includes a laser tracker and an inventive laser target assembly.

In accordance with exemplary practice of the present invention that involves weight-loading, a laser target assembly includes a generally rectangular member, four legs, a shaft, at least one weight, and a retroreflective target (such as a spherically mounted retroreflector). The generally rectangular member is characterized by four corners and a central aperture extending therethrough. Each of the four legs is connected to the generally rectangular member at a corner of the rectangular member. The shaft passes through the central aperture of the generally rectangular member. The retroreflective target is connected to the shaft at an axial end of the shaft. At least one weight is connected to the shaft so that the shaft when in a vertical position exerts a downward force against the retroreflective target in the vertical axial direction of the shaft. The laser target assembly is positionable upon a surface at each of plural locations of the surface whereby the legs and the retroreflective target are contiguous the surface, and wherein at each location of the surface the retroreflective target is contiguous the surface in accordance with the downward force exerted by at least one weight.

According to exemplary embodiments of an inventive laser target device, also referred to herein as an inventive "bore tool," a cradle holds an SMR (spherically mounted retroreflector) in constant tension (e.g., in a spring-loaded and/or weight-loaded manner) against an inner bore surface of an object to be measured in order to use laser tracking to determine surface profile of the object. The inventive cradle includes a body, four legs, a shaft, and a coil spring. Based on the thickness of the object being measured and/or the position of the SMR with respect to the object, various geometric and potential characteristics are inventively determinable such as inner diameters, corrosion, straightness, and flatness. Exemplary inventive practice allows for quicker data captures with greater accuracy, as compared with current methods.

The present invention can be practiced so as to involve spring-loading and/or weight-loading. According to an exemplary inventive embodiment that involves both spring-loading and weight-loading, the spring-loading and the weight-loading act in concert to impose a downward pressure so that the laser tracking target at the bottom end of the shaft is maintained in a state of constant contiguity with respect to the underlying surface of the object being measured.

An inventive cradle is capable of holding an SMR in constant tension against the inner surface of a cylinder or tube or any other structure with an internal feature. The cradle allows the SMR to move freely in a vertical axis in order to capture the surface profile accurately. The frame of the cradle minimizes the lateral motion of the SMR to keep the recorded data along the center plane of the cradle. The weight of the cradle is such that gravity will keep the inventive bore tool along the center plane of the cradle. According to some inventive embodiments, a magnetic mount keeps the SMR housing connected to the cradle. The terms "cradle" and "carriage" are interchangeably used herein in contexts of describing the present invention.

An inventive bore tool can be displaced in various ways, such as by being mechanically pulled through the bore, either via human or motor power. Alternatively, the inventive bore tool itself can be provided with motor-driven capability. The selected technique for relocating the SMR may depend on the length of the bore. According to some inventive embodiments, the cradle is adjustable to conform to the shape of the bore that is to be measured.

Exemplary inventive practice provides an inner bore metrology tool that is used to determine numerical data relating to the inner surface of a tube or cylinder or other three-dimensional shape characterized by at least one interior surface region. A laser tracker is implemented for acquiring the numerical data. According to exemplary effectuation of quantitative data capture, a laser tracker shoots out a laser beam that hits the center of an SMR being held by an inventive bore tool. Some of the laser light is reflected by the SMR back to the tracker; this reflected light informs the tracker as to the exact position of the SMR. While the inventive bore tool moves, the laser tracker constantly or repeatedly records the new position of the SMR as detected via the laser beam. The inventive boor tool ensures that the SMR is at all times pressed against a surface of the geometric object of measurement interest.

Although a hollow cylindrical object is emphasized herein by way of example, the inventive methodology can be applied to measure practically any geometric object of interest. The object can be linear or curvilinear, and can be polyhedral or non-polyhedral (e.g., with flat and/or curved surfaces). Geometric shapes that may be suitable for inventive practice include but are not limited to rectangular prism (e.g., cube), nonrectangular prism (e.g., triangular prism), pyramid, sphere, ellipsoid, cylinder, torus, cone, and a variety of irregular shapes.

Conventional metrological practice provides for iterative placement of a spring-loaded touch probe at discrete locations of a bore, wherein the probe is situated at a single location for a measurement and is subsequently resituated at a different location of the bore for the next measurement. In contrast, through use an inventive bore tool in association with a laser tracker, a practitioner can obtain results at a greater number of points along a bore in a much shorter time and with greater accuracy.

Many modem laser trackers allow for the creation of a virtual plane down the axis of a bore, thus easing data recordation in a very tight band. In addition, a bore can be rotated with an inventive bore tool in place, and a practitioner can determine the true longitudinal axis along the entire bore by capturing various cross-sections throughout the length of the bore.

Some inventive embodiments provide for adjustable legs of the cradle. Adjustability of the legs can be with respect to leg length and/or leg angle. For instance, the cradle legs can be expandable and contractible to suit bores of different sizes. Furthermore, inventive practice can provide for adjustments of the angularities of the cradle legs for similar purposes. An ordinarily skilled artisan who reads this disclosure will appreciate various known mechanisms and techniques for imparting angular adjustability to leg in practicing the present invention.

The term "rod," as used herein in describing the present invention, broadly refers to any elongate structure suitable for effecting mechanical connection between a body and an SMR, and for acting in a spring-loading manner in concert with a helical (coil) spring coaxially adjoining the rod. According to some embodiments of the present invention, an inventive rod is longitudinally adjustable similarly as some conventional probes are longitudinally adjustable. The probe-like rod is adjusted to and set at a selected length. For instance, a probe-like rod is adjusted initially to determine the inner diameter, and this determination ensures best representation by the SMR of the surface contour. An ordinarily skilled artisan who reads this disclosure will appreciate various known mechanisms and techniques for imparting longitudinal adjustability to a rod in practicing the present invention.

The ordinarily skilled artisan who reads this disclosure will appreciate that multifarious combinations of leg lengths and leg angles are possible in inventive practice, in order to suit the shape or configuration of the surface upon which the inventive device is mobile. An inventive embodiment can have all equal leg angles and all equal leg lengths, or all equal leg angles and two or more unequal leg lengths, or all equal leg lengths and two or more unequal leg angles; or two or more unequal leg angles and two or more unequal leg lengths.

An important inventive principle is that the vertical rod of an inventive device constantly applies a downward vertical force upon a surface beneath the inventive device. Since the vertical rod constantly applies a downward force, an object (e.g., a retroreflective sphere) attached at the bottom of the vertical rod) constantly applies a downward vertical force upon a surface underneath the inventive device, and hence maintains a constant contiguity with respect to the surface. According to various inventive embodiments, the downward force that brings about the downward pressure by the rod is accomplished using (i) a spring (e.g., metal spring), or (ii) one or more weights (e.g., metal weights), or (iii) a combination of a spring and one or more weights.

Inventive practice provides for use of one or more weights in lieu of or in addition to the spring, thereby maintaining pressure against a surface, such as the inner surface of an object having an interior void. One or plural weights can be associated with the vertical rod, and/or with one, two, three, or all four legs. Particularly when one or more weights are used, the fragility of the surface upon which an inventive device sits and moves (e.g., an inner surface such as that of an inner bore) should be taken into consideration by a practitioner of the present invention.

It is desirable to apply enough force downwards to maintain a contact of the target with the surface. At the same time, it is undesirable to apply too much pressure, i.e., so much pressure that it actually alters the surface from its existing state. An important guideline for a practitioner of the present invention is to keep the center of gravity of the inventive device as low as possible. This is especially significant for inventive embodiments implementing one or more weights. According to frequent inventive practice, a weight that is shaped as a flat cylinder may be beneficial insofar as promoting a low and stable center of gravity.

The examples of inventive practice that are described herein focus upon applications involving laser tracking. Nevertheless, the present invention may be propitiously practiced in a variety other applications. An inventive device is positionable upon a surface whereby its legs and an object attached at the bottom of the vertical rod contact the surface. Downward loading is exerted by at least one weight upon the attached object, and/or tension is exerted by a vertical spring upon the attached object. Accordingly, regardless of whether the inventive device is stationary or moving, the attached object at the bottom of the vertical rod presses against the surface below with constancy, maintaining consistently forceful contact therewith.

BRIEF DESCRIPTION OF THE DRAWINGS

The present invention will now be described, by way of example, with reference to the accompanying drawings, wherein like numbers indicate same or similar parts or components, and wherein:

As shown in FIG. 1, the inventive carrier is spring-loaded and is carrying a spherical retro-reflective target.

As shown in FIG. 2, the inventive carrier and accompanying retroreflective target are reduced in size and contextualized inside a hollow cylinder.

As shown in FIG. 4, according to the inventive tracking system a laser tracker emanates a laser beam that hits the retrorefective target being carried by the inventive carrier as shown in FIG. 1.

As shown in FIG. 11, the inventive carrier is weight-loaded atop the vertical rod and is carrying a spherical retro-reflective target.

As shown in FIG. 18, the inventive carrier is spring-loaded, and is weight-loaded atop the vertical rod, and is carrying a spherical retro-reflective target.

As shown in FIG. 18, the inventive carrier is spring-loaded, and is weight-loaded, and is carrying a spherical retro-reflective target. In terms of weight-loading, one or more weights can be attached atop the vertical rod, and/or atop the body, and/or along the vertical rod, and/or along at least one leg.

DESCRIPTION OF EXEMPLARY EMBODIMENTS OF THE INVENTION

Figure 8:
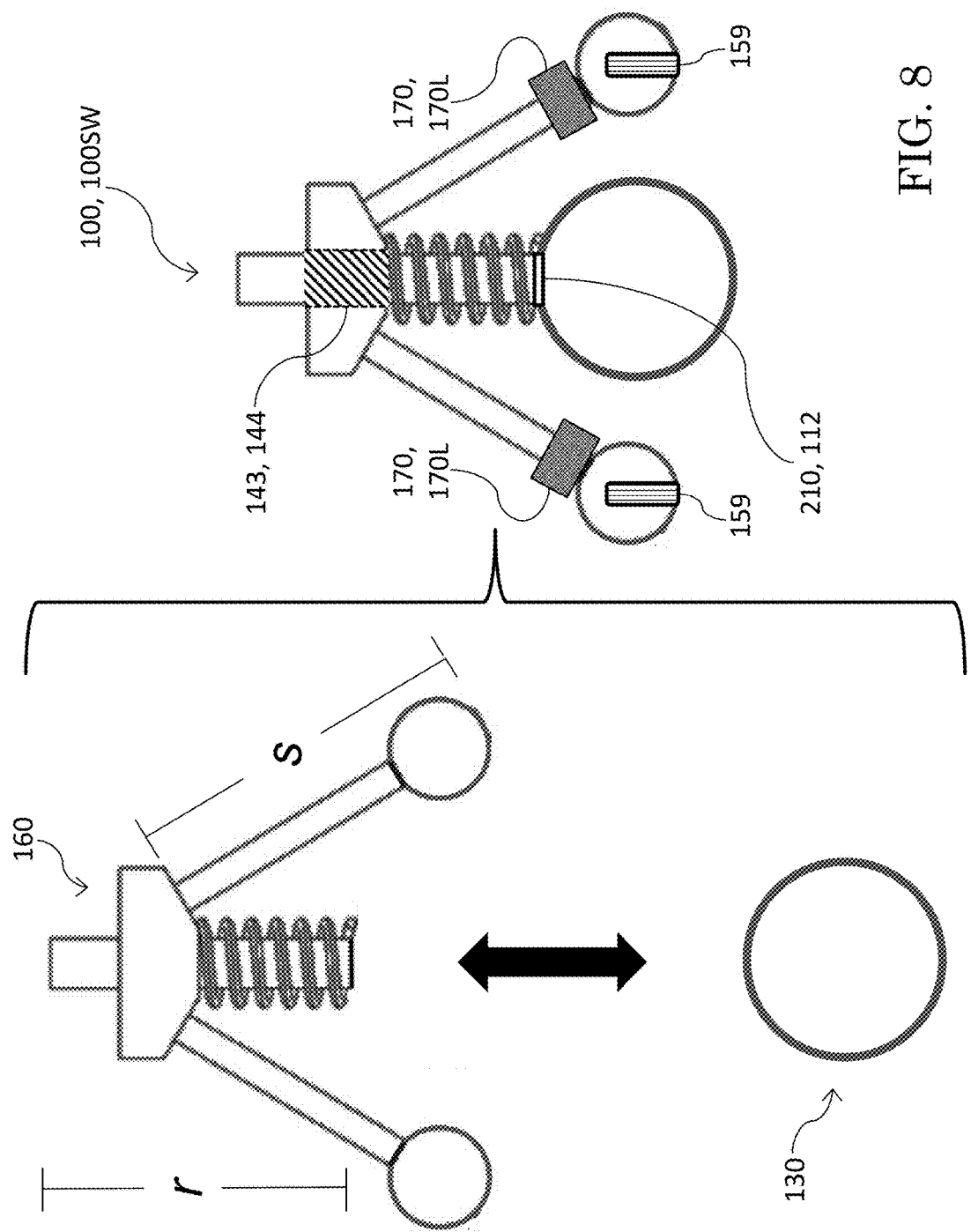
FIG. 8 is a diagram illustrating an example of coupling and uncoupling of a laser target (e.g., an SMR) with respect to a laser target cradle, in accordance with the present invention.

Referring now to the figures, laser target device 100 includes straight vertical rod 110, coil spring 120, retroreflective target 130, body 140, and four obliquely angled legs 150. The inventive device 100 is dichotomized into two components, viz., (i) a laser target 130 and (ii) a laser target carriage (cradle) 160 for holding laser target 130. Target carriage 160 includes the straight vertical rod 110, the spring 120, the body 140, and the four legs 150. As illustrated in FIG. 8, target carriage 160 and retroreflective target 130 are coupled to form inventive laser target device 100. Retroreflective target 130 is, for example, a spherically mounted retroreflector (SMR) describing a spheroidal or approximately spherical shape.

Rod 110 is preferably made of a strong rigid material such as a suitable composite or steel or other suitable metal. Coil spring 120 is preferably a helical metal spring such as made of spring steel. Body 140 and legs 150 can be made of a variety of metal (e.g., steel or aluminum), polymeric (e.g., plastic), or composite (e.g., nylon-reinforced plastic or other fiber-reinforced matrix) materials. Depending on the inventive embodiment (e.g., the environment of the data capture), any of diverse materials can be used for the parts and components of inventive device 100.

Spring 120 has an upper spring end 121 and a lower spring end 122. Rod 110 has an upper rod end 111, a lower rod end 112, an upper rod portion 113 and a lower rod portion 114. Upper rod portion 113 is bounded by upper rod end 111 and is uncircumscribed by coil spring 120. An upper part of upper rod portion 113 is bounded at the top by upper rod end 111 and projects above upper body surface 141 of body 140. Lower rod portion 114 is bounded at the bottom by lower rod end 112 and is circumscribed by spring 120.

Figure 1:
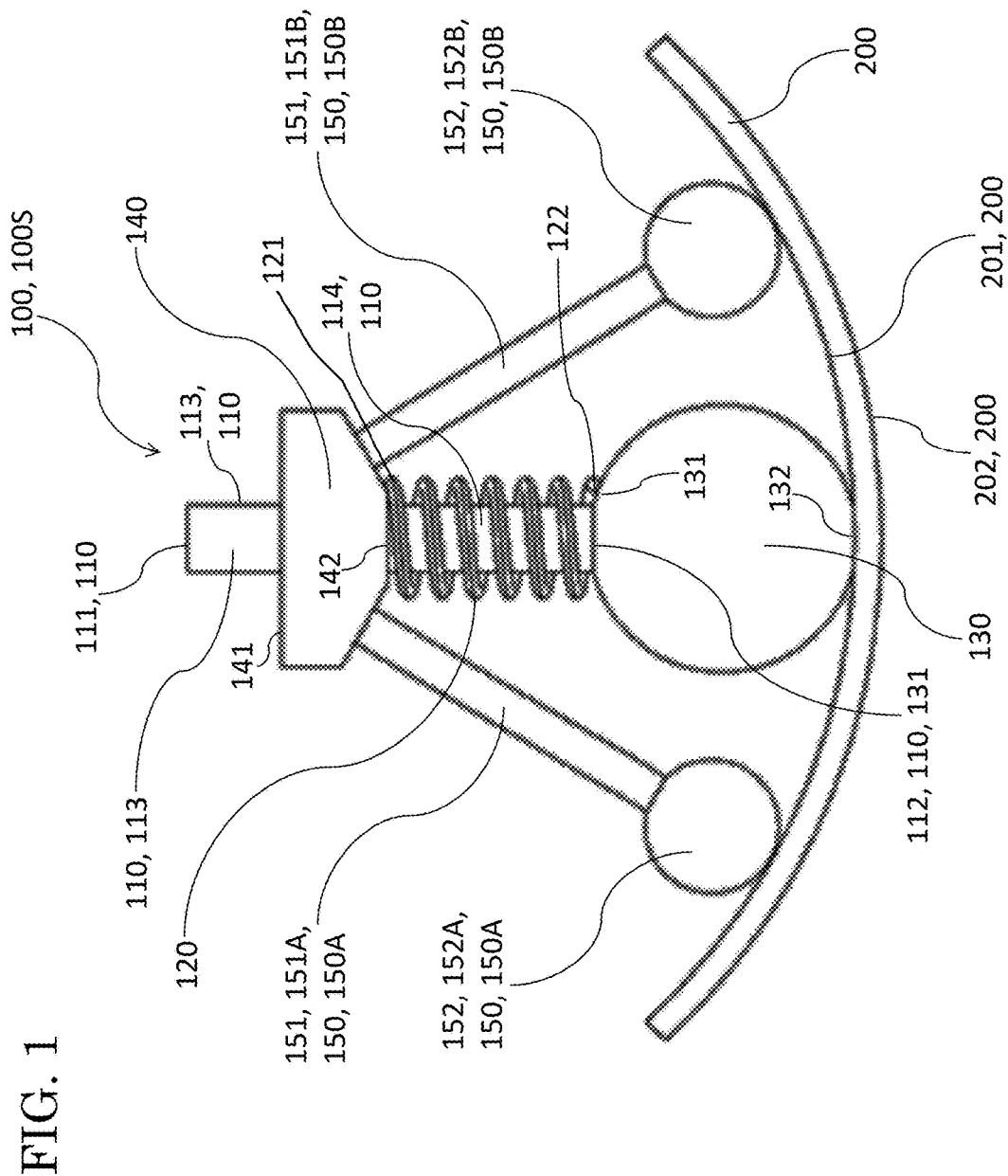
FIG. 1 is an elevation view of an embodiment of a laser target carrier in accordance with the present invention.
Figure 2:
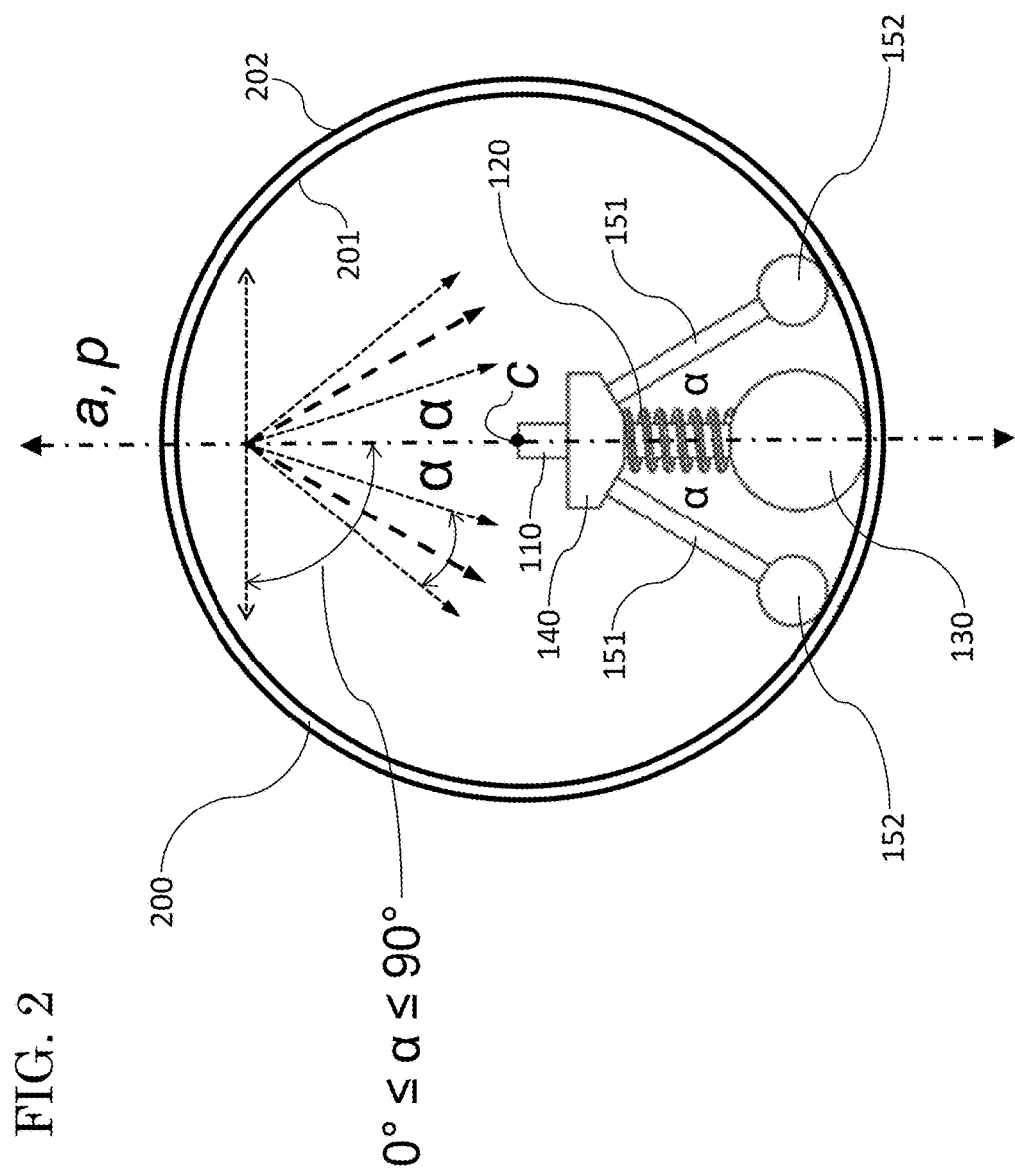
FIG. 2 is an elevation view of the inventive carrier and the retroreflector target carried by the inventive carrier as shown in FIG. 1.
Figure 3:
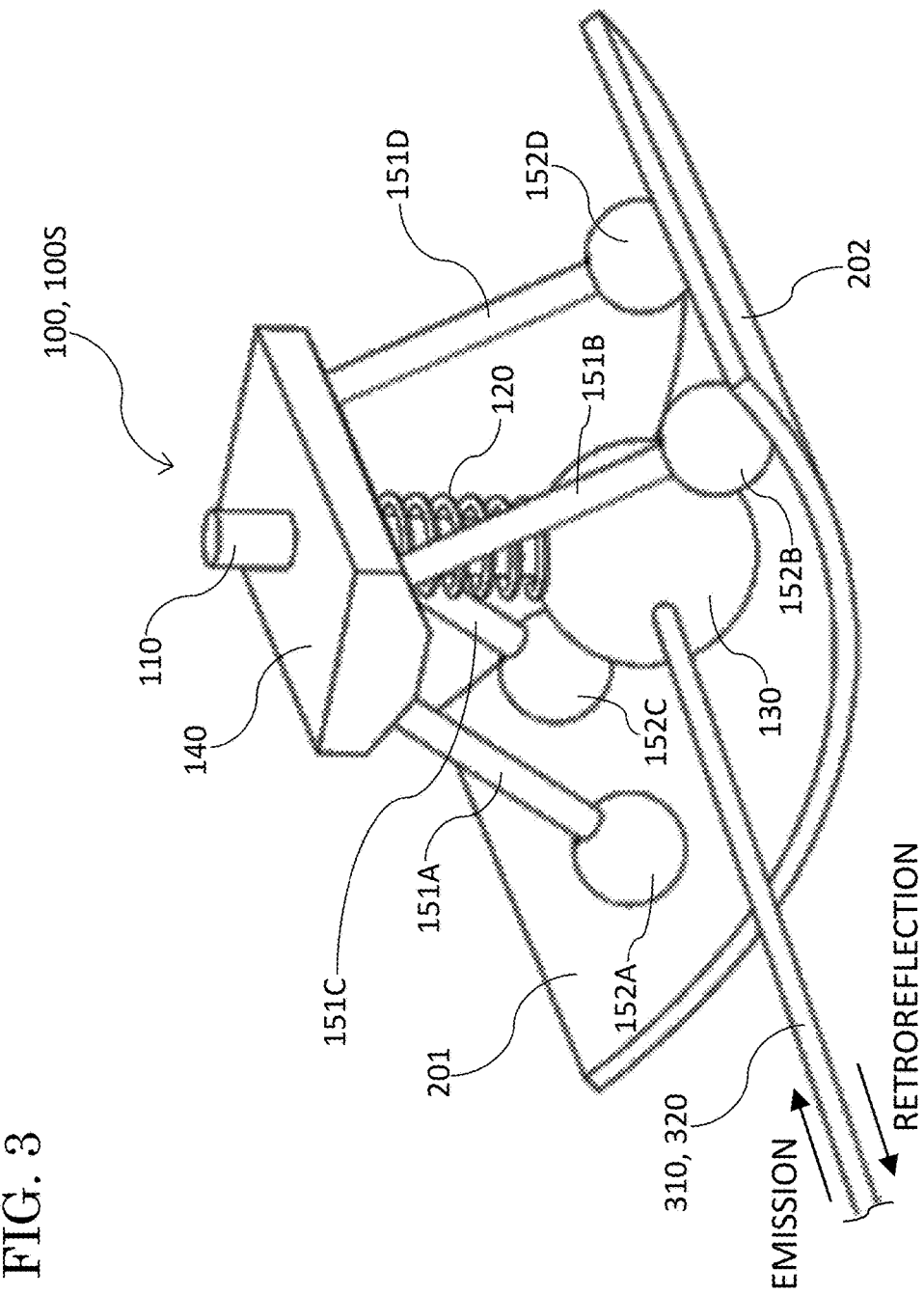
FIG. 3 is a perspective view of the inventive carrier and accompanying retroreflective target shown in FIG. 1.

As depicted in FIGS. 1 through 3, inventive device 100 is positioned within a hollow cylindrical object 200, which has a longitudinal geometric axis c, an inside cylindrical surface 201, and an outside cylindrical surface 202. Carriage 160 holds target 130 in place so as to press target 130, in a spring-force manner via spring 120, against the area of the inside surface 201 upon which inventive device 100 is situate. Each leg 150 includes a straight stem 151 and a spheroidal or approximately spherical foot 152. Target 130 is spring-forcefully maintained pressing downward against inside cylindrical surface 201 whereby: the respective four feet 152 of the four legs 150 are sitting upon inside cylindrical surface 201; upper spring end 121 presses against a bottom surface 142 of body 140; lower spring end 122 presses against a top surface 131 of target 130.

Accordingly, carriage 160 is coupled with target 130 at the bottom 112 of vertical rod 110 whereby the top 121 of spring 120 pushes against the bottom 142 of body 140 and the bottom 122 of spring 120 pushes against the top 131 of target 130. Supported by legs 150, target 130 continuously adjusts in height (vertical position along axis a) so that the bottom 132 of target 130 remains in constant spring-tension contact with inner cylindrical surface 201, which is the surface on which inventive target device 100 is situate, either moving or stationary.

Figure 4:
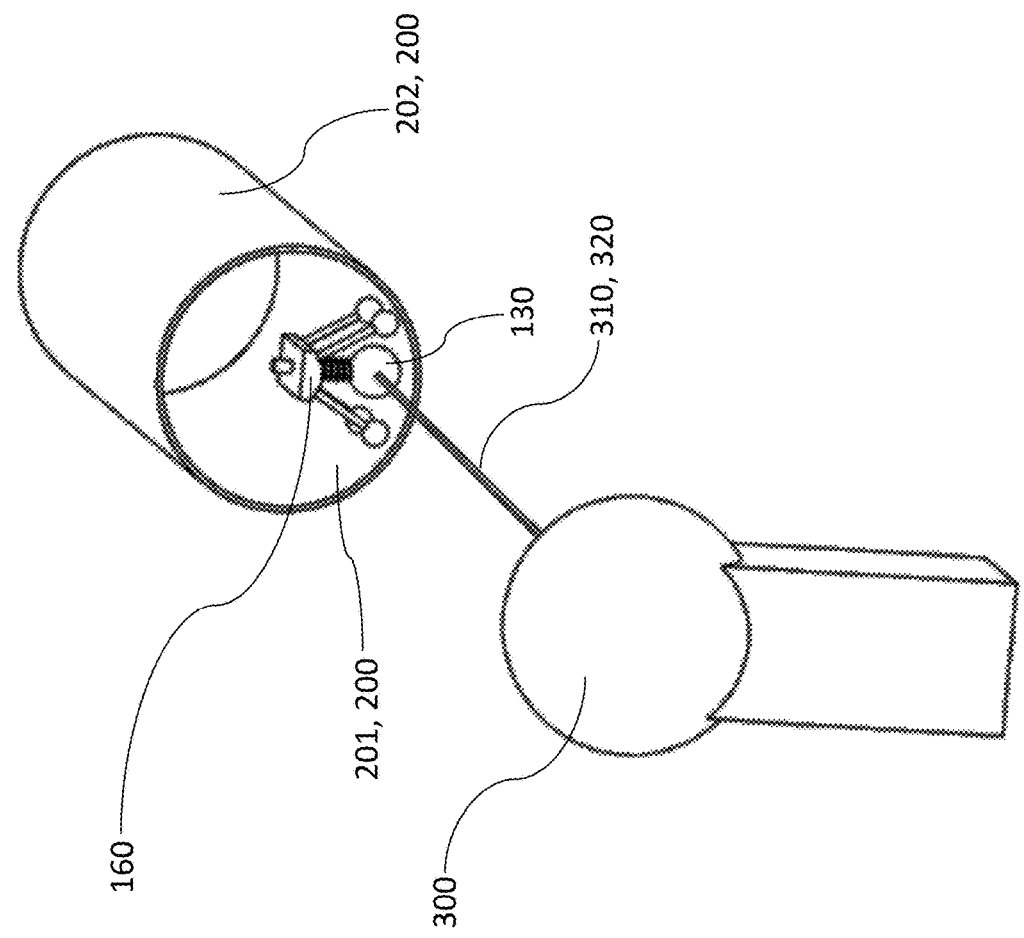
FIG. 4 is a perspective view of an embodiment of a laser tracking system in accordance with the present invention.

Reference now being made to FIG. 3 and FIG. 4, laser tracker 300 directs laser beams 310 at target 130, and receive laser retroreflections 320 from target 130, at various locations of target 130 upon inner cylindrical surface 201. At selected locations of carriage 160 (and correspondingly of target 130), laser beams 310 are emitted by laser tracker 300 and laser retroreflective beams 320 are received by laser tracker 300. These measurements can be conducted while carriage 160 is stationary or moving.

The ordinarily skilled artisan who reads the instant disclosure will appreciate the various ways in which movability upon inner cylindrical surface 201 can be imparted to inventive target device 100, such as involving electromechanical propulsion. For instance, inventive target device 100 can be pushed to or pulled from various locations via external device. Optionally, inventive device can be repositioned "the old-fashioned way" upon inner cylindrical surface 201, viz., manually.

As another example, carriage 160 can contain a remotely controllable motor for effecting movement via small wheels 159 respectfully housed in feet 152 such as shown in FIG. 8. For example, an inventive carriage 160 can have two front wheels 159, or two back wheels 159, or four wheels 159. The bottom of each wheel 159 is approximately even with or slightly below the bottom of the associated foot 152. Each wheel 159 can be vertically placed within its foot 152. In addition, planar-axis rotatability of wheel 159 within its foot 152 can be provided to maintain verticality of wheel 159 in accordance with variation in leg angle $\alpha$.

Figure 5:
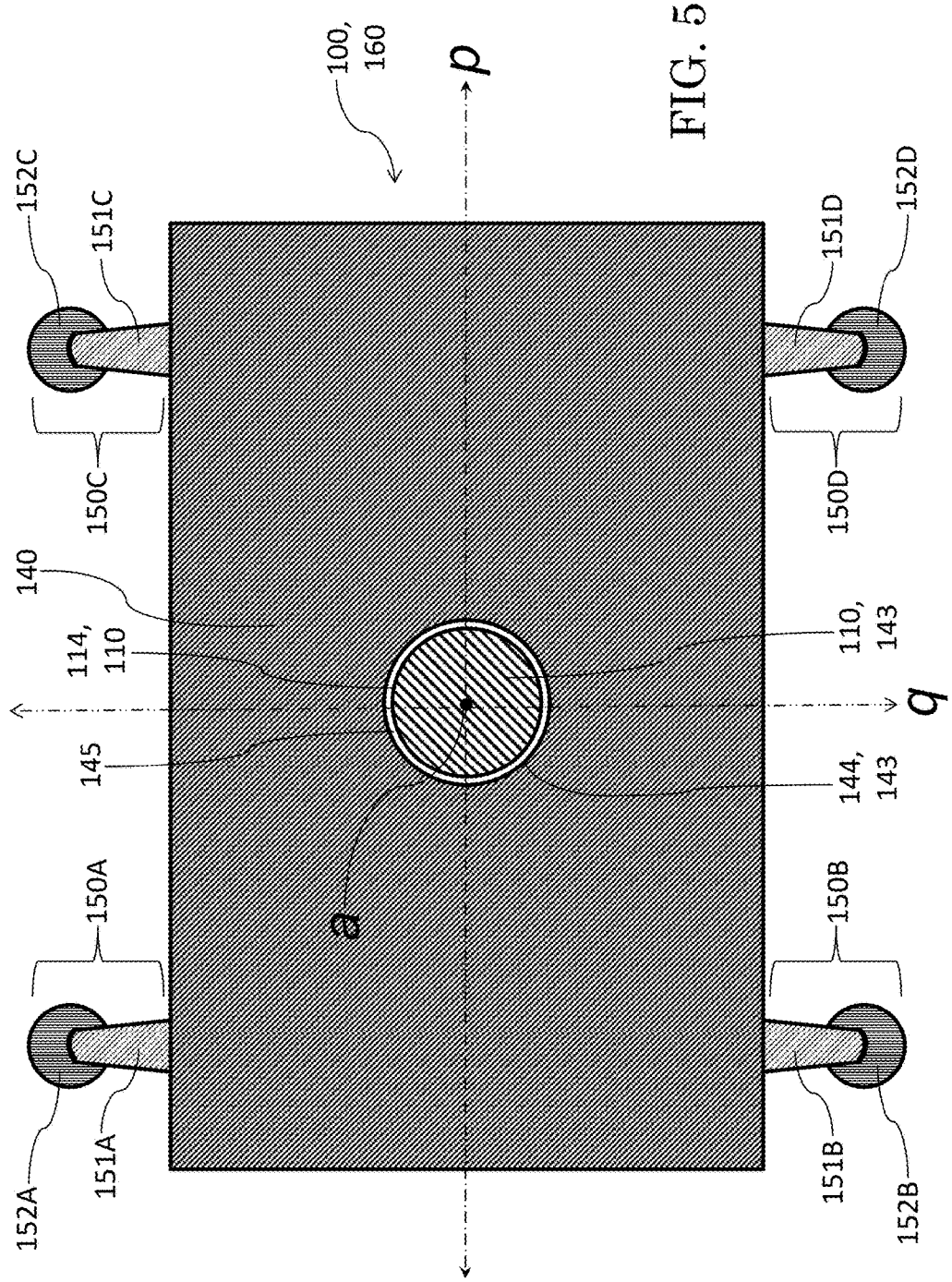
FIG. 5 is a top plan view of the inventive carrier shown in FIG. 1.

Particularly with reference to FIG. 5, four legs 150-viz., legs 150A, 150B, 150C, 150D—are connected to a lower portion of body 140 and project downward and obliquely outward. Body 140 is shown to have a rectangular plan profile. The four legs 150 are arranged in a rectangular configuration not unlike that which characterizes automobiles, carts, wagons, and other conventional land vehicles. Leg 150A includes stem 151A and foot 152A. Leg 150B includes stem 151B and foot 152B; leg 150C includes stem 151C and foot 152C; leg 150D includes stem 151D and foot 152D. The four legs 150 are connected at the four rectangular corners of body 140; more specifically, the respective four stems 151 are attached at the corner locations of body 140.

Figure 6:
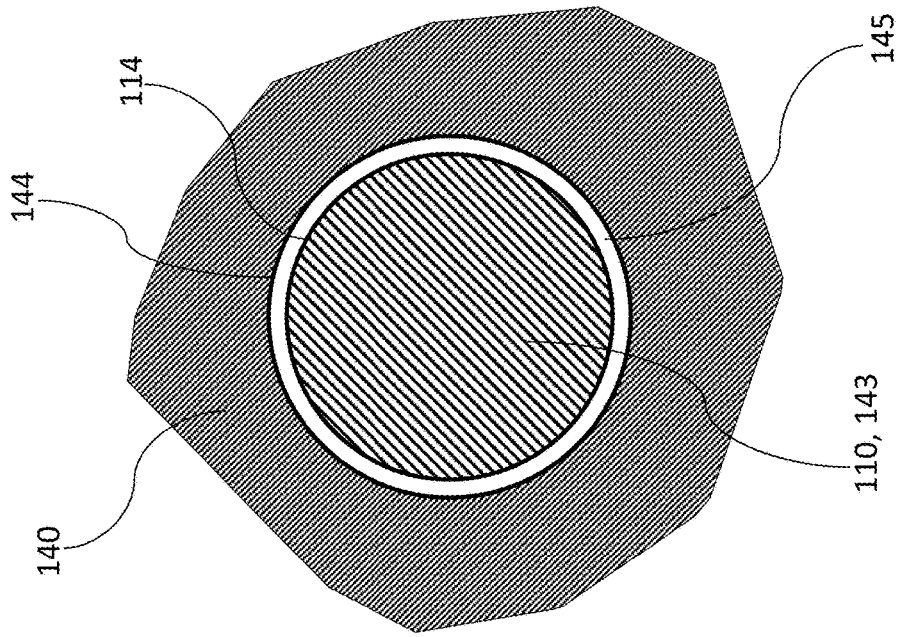
FIG. 6 is a partial and enlarged top plan view of the inventive carrier shown in FIG. 1, particularly illustrating the main body having an aperture and the vertical rod passing through the aperture.

As illustrated in FIG. 2 and FIG. 6, vertical rod 110 of carriage 160 is characterized by a vertical geometric axis a. Retroreflector 130 is spheroidal and is attached to rod 120 at the lower rod end 112. Coil spring 120 generally describes a cylindrical shape and encompasses a lower portion of rod 120. Accordingly, spring 120 and retroreflector 130 are each similarly characterized by vertical axis a, and in fact generally the entire inventive device 100 is characterized by symmetry about vertical axis a. Inventive device 100 is also characterized by a vertical geometric bisector plane p, in which vertical axis a lies.

The four legs 150 are each angled obliquely at the same angle $\alpha$ with respect to bisector plane p. Angle $\alpha$ can vary in inventive practice, depending on the inventive embodiment. According to exemplary inventive practice, leg angle $\alpha$ is greater than or equal to zero degrees and less than or equal to ninety degrees; that is, $0° \leq \alpha \leq 90°$. Hence, depending on the inventive embodiment, one or more legs 150 can have a vertical longitudinal axis s ($\alpha=0°$) or a horizontal longitudinal axis s ($\alpha=90°$). Nevertheless, according to more usual inventive practice, leg angle $\alpha$ is greater than zero degrees and less than ninety degrees; that is, $0° < \alpha < 90°$. According to many embodiments and applications of the present invention, leg angle $\alpha$ falls within a leg angle $\alpha$ range between fifteen degrees inclusive and seventy-five degrees inclusive; that is, the angular range for these inventive embodiments is $15° \leq \alpha \leq 75°$. According to many inventive embodiments, all four values of leg angle $\alpha$ are equal during laser tracking implementation of inventive target device 100.

As shown in FIG. 8, rod 110 has a length r, and each leg 150 has a length s. Some embodiments of the present invention are attributed with adjustability with respect to one, two, or all three of the following: leg angle $\alpha$; rod length r; leg length s. The ordinarily skilled artisan who reads the instant disclosure will appreciate the various mechanisms and techniques—such as involving telescoping, locking, folding, etc.—for providing adjustability of rod 110 length r and/or leg 150 length s. Many inventive embodiments having adjustable leg length s will provide this capability for each of the four legs 150. Furthermore, the ordinarily skilled artisan who reads the instant disclosure will appreciate the various mechanisms and techniques, such as involving pivoting—for providing adjustability of leg angle $\alpha$. Many inventive embodiments having adjustable leg angle $\alpha$ will provide this capability for each of the four legs 150.

Figure 10:
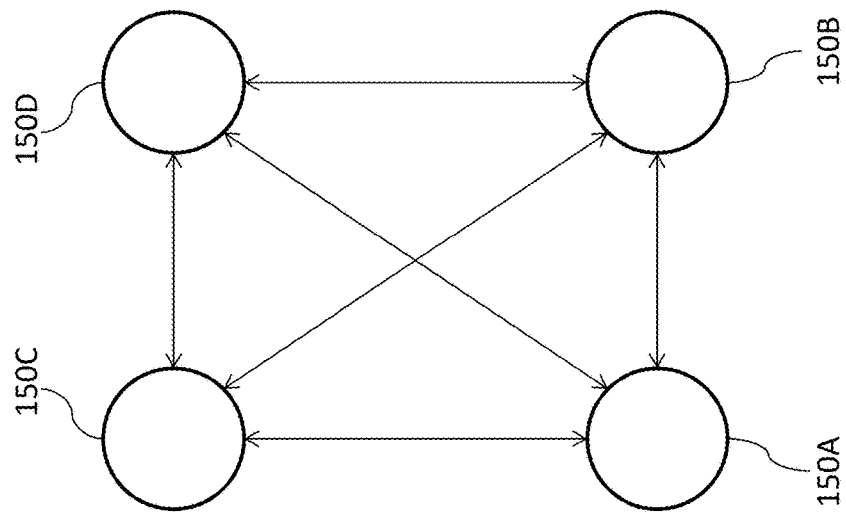
FIG. 10 is a diagram illustrating variability of either leg length or leg angle or both leg length and leg angle, such variability possible between any two legs of an inventive device, depending on the inventive embodiment.
Figure 9:
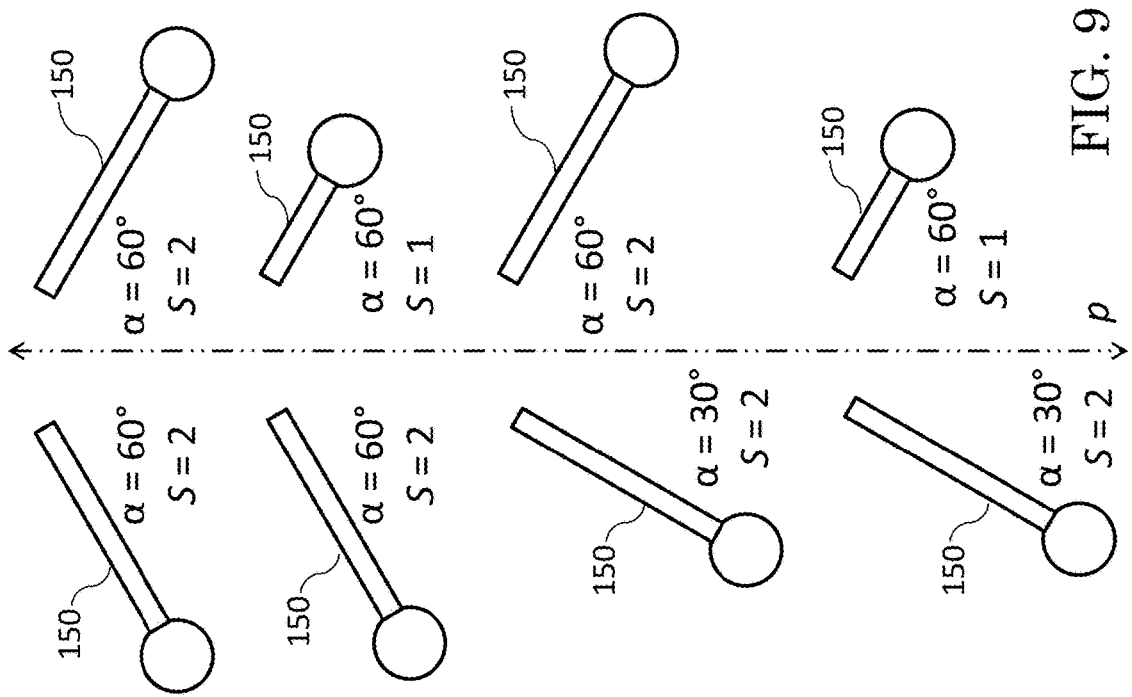
FIG. 9 is diagram showing examples of various leg lengths and leg angles that angles are possible in inventive practice, depending on the inventive embodiment.

Frequent inventive practice thus provides for all four legs 150 having the same leg angle $\alpha$ and the same leg length s. However, also with reference to FIGS. 9 and 10, the present invention can be practiced whereby: all four legs 150 have the same leg length s and equal leg angles $\alpha$; or all four legs 150 have the same leg length s and two or more legs 150 have unequal leg angles α; or all four legs 150 have the same leg angle α and two or more legs 150 have unequal leg lengths s; or two or more legs 150 have unequal leg angles α and two or more legs 150 have unequal leg lengths s. Inequality of leg angles α and/or leg lengths s may be especially propitious for inventive practice with respect to some non-cylindrical surfaces. For instance, with respect to a geometric surface characterized by a step, it may be beneficial to implement an inventive device having leg angles α that are equal on the same side of bisector plane p (shown in FIG. 5) and are unequal on opposite sides of bisector plane p, thus facilitating contiguity of target 130 with respect to the step.

Figure 7:
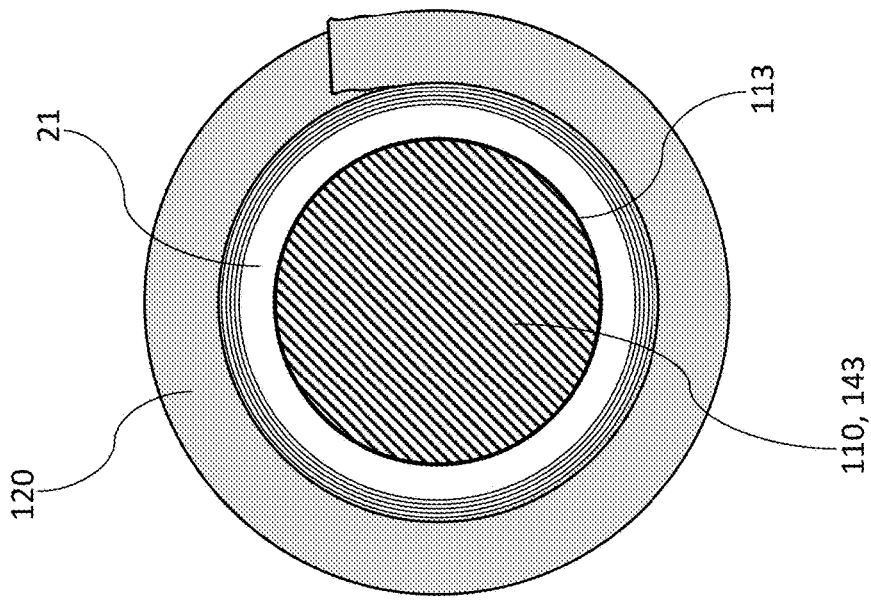
FIG. 7 is a partial and enlarged top plan view of the inventive carrier shown in FIG. 1, particularly illustrating the vertical spring and the vertical rod encompassed by the vertical spring.

Particularly as illustrated in FIGS. 5 through 7, body 140 has a vertical central through-hole 143 bounded by a cylindrical inside hole surface 144. Rod 110 has a cylindrical outside rod surface 114. The diameter of through-hole 143 is slightly larger than the diameter of rod 110. Accordingly, rod 110 can fit inside through-hole 143 and translate therein up-and-down along vertical axis a. For instance, rod 110 can slide up-and-down through through-hole 142 whereby outside rod surface 114 contacts inside hole surface 144 at interface 145 with a low amount of friction, and thus there is sufficient freedom of vertical motion and no (or insignificant) lateral movement of rod 110.

Rod 110 at its lower end 112 is joined with target 130 at its upper surface 131 at a junction 210, such as shown in FIG. 8. For instance, rod 110 and target 130 can be adhesively or magnetically joined whereby the adhesive or magnetization is present on rod 110 or target 130. According to some inventive embodiments, inventive device 100 further includes weights 220 (e.g., made of steel or other metal), which are added to rod 110 and/or legs 150 of inventive device 100 in order to lower the center of gravity of inventive device 100, thereby preventing rotation of inventive device 100. As shown by way of example in FIG. 8, four equal weights 220 can be respectively attached to the four legs 150 at corresponding locations.

Three main modes of practice of the present invention are those that involve: (i) spring-loading of a target; (ii) weight-loading of a target; (iii) both spring-loading and weight-loading of a target. Spring-loaded inventive practice is exemplified, e.g., in FIGS. 1 and 3; an inventive device 100 according to this mode is more specifically designated herein inventive device 100S. Generally speaking, the inventive principles described with reference to FIGS. 1 through 10 are applicable to all three modes of inventive practice. Weight-loaded (but not spring-loaded) inventive practice is exemplified in FIGS. 11 through 17 and 21 through 24; an inventive device 100 according to this mode is more specifically designated herein inventive device 100W. Combined weight-loaded and spring-loaded inventive practice is exemplified in FIGS. 8 and 18 through 20; an inventive device 100 according to this mode is more specifically designated herein inventive device 100S.

With reference to FIGS. 11 through 20, one or more weights 170 can be made part of an inventive target-carrying device 100 in order to exert downward loading upon target 130. A weight 170 that is coupled with vertical rod 110 is more specifically designated herein weight 170R. A weight 170 that is coupled with a leg 150 (e.g., with stem 151) is more specifically designated herein weight 170L. A weight 170 that is coupled with vertical rod 110 and/or body 140 so as to sit atop body 140 is more specifically designated herein weight 170X. A weight 170R that is coupled with vertical rod 110 atop vertical rod 110 is more specifically designated herein weight 170RT. A weight 170R that is coupled with vertical rod 110 at an axial-lengthwise location of vertical rod 110 is more specifically designated herein weight 170RL.

Inventive practice is possible in any combination of one or more rod weights 170R, leg weights 170L, and body weights 170X, viz.: at least one weight 170R; at least one weight 170L; at least one weight 170X; at least one weight 170R and at least one weight 170L; at least one weight 170R and at least one weight 170X; at least one weight 170R and at least one weight 170X; at least one weight 170R and at least one weight 170L and at least one weight 170X.

According to usual inventive practice, weight 170RT is a solid axisymmetric object of uniform density; weights 170RL, 170L, and 170X are each a solid axisymmetric object of uniform density having a through-hole or aperture to accommodate a vertical rod 110 passing therethrough. According to frequent inventive practice, weights 170 are solid or hollow cylinders. A weight 170 can be attached to a vertical rod 110 or a leg 150 or a body 140 mechanically (e.g., using bolts), adhesively, and/or magnetically. Grooves, holes, or other configurative features can be provided in weights 170 and/or rod 110 and/or leg 150 to afford compatible coupling. According to some inventive embodiments, the inventive device's vertical rod 110 has, at the top 111 of vertical rod 110, a tapped central hole (such as hole 190 shown in FIGS. 21 and 23) that extends a relatively short distance into vertical rod 110 in the direction of axis a, thereby allowing for various weights 170RT to be attached via a bolt or other fastener. Weight 170RT may also be provided with a central opening to further such attachment.

Figure 11:
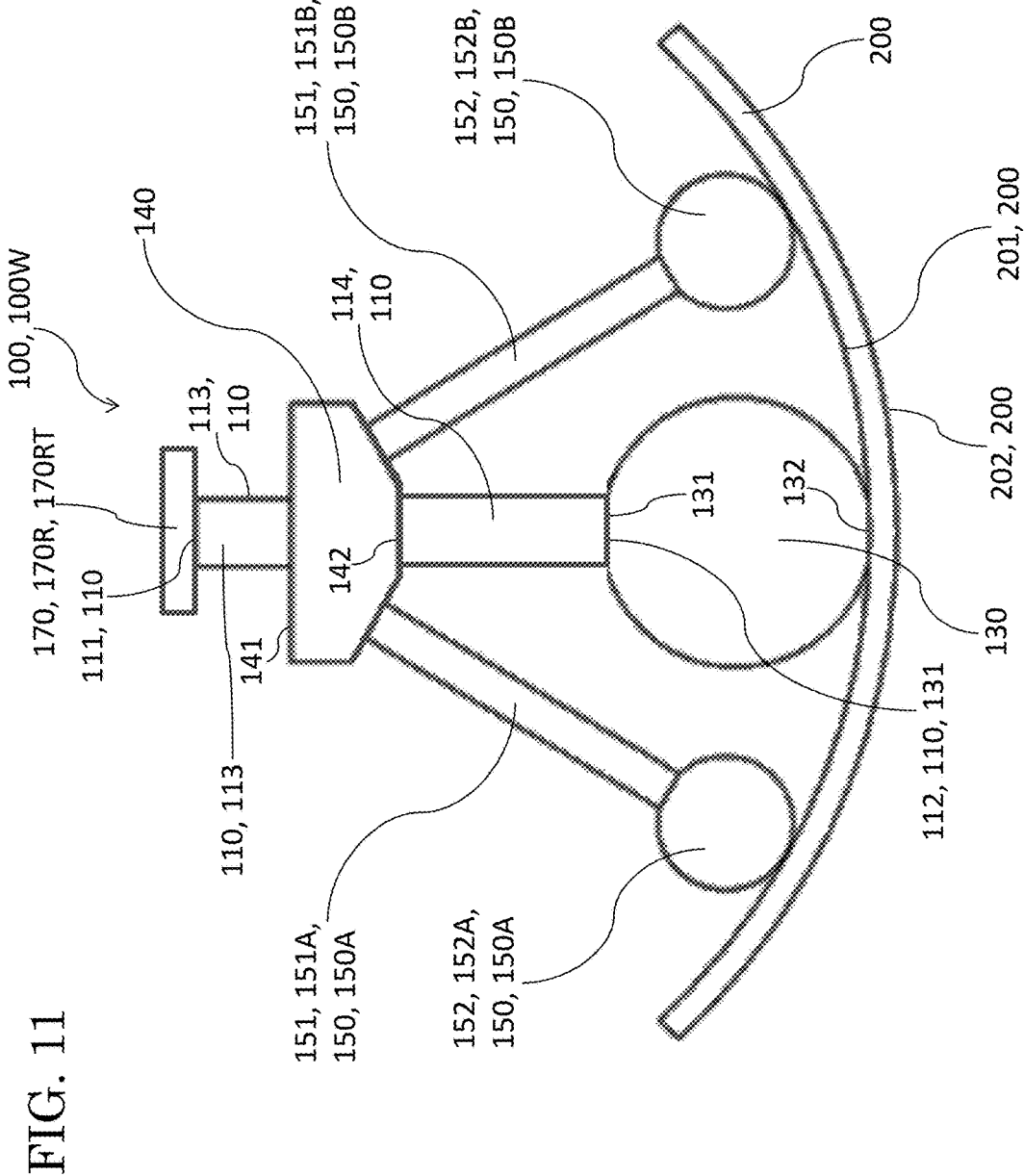
FIG. 11 is an elevation view, similar to the view of FIG. 1, of another embodiment of a laser target carrier in accordance with the present invention.
Figure 12:
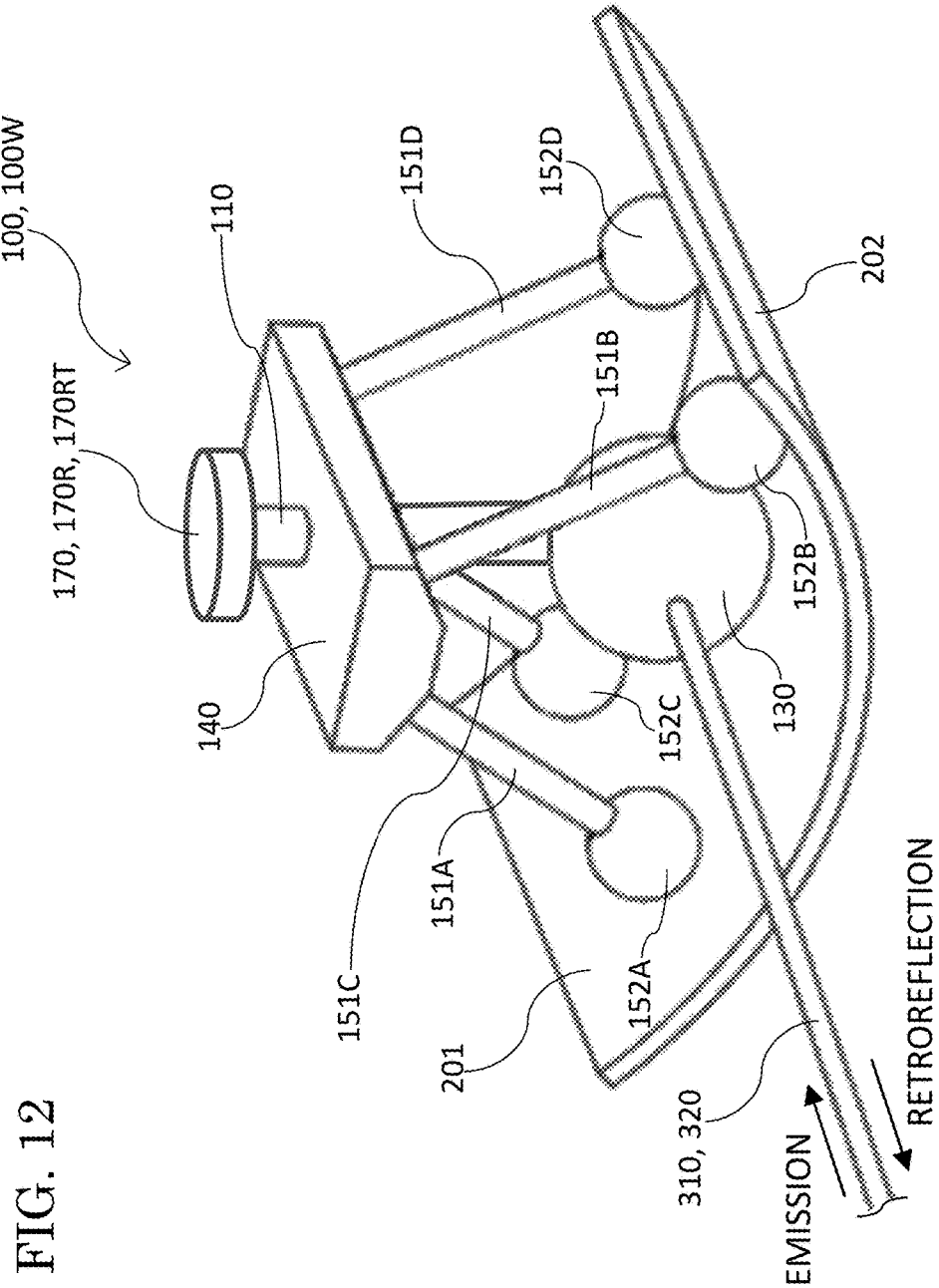
FIG. 12 is a perspective view, similar to the view of FIG. 3, of the inventive carrier and accompanying retroreflective target shown in FIG. 11.
Figure 13:
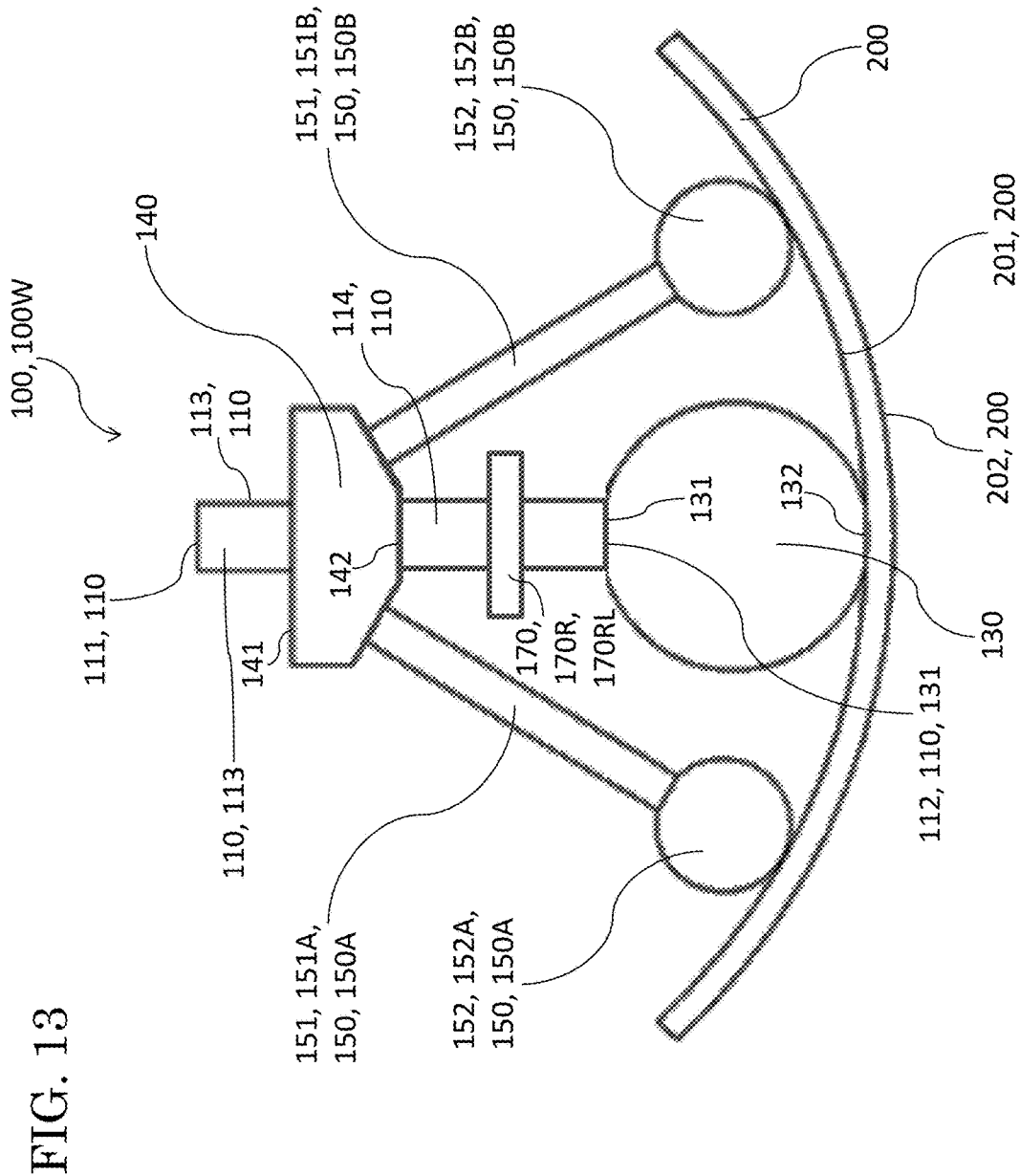
FIGS. 13 through 17 are elevation views, similar to the views of FIG. 1 and FIG. 11, of various inventive embodiments of a weight-loaded laser target carrier. One or more weights can be attached atop the vertical rod, and/or atop the body, and/or along the vertical rod, and or along at least one leg.
Figure 14:
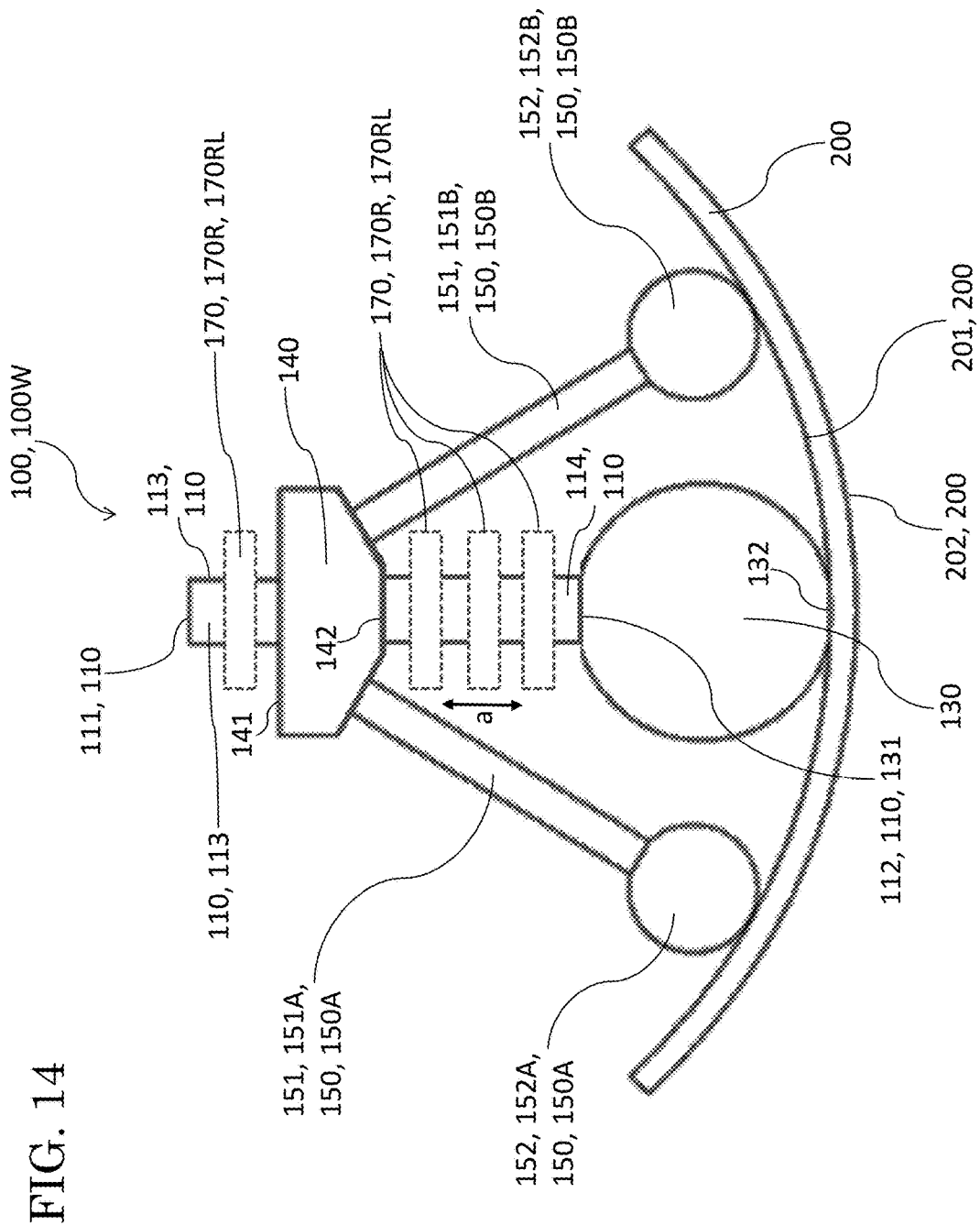
Figure 15:
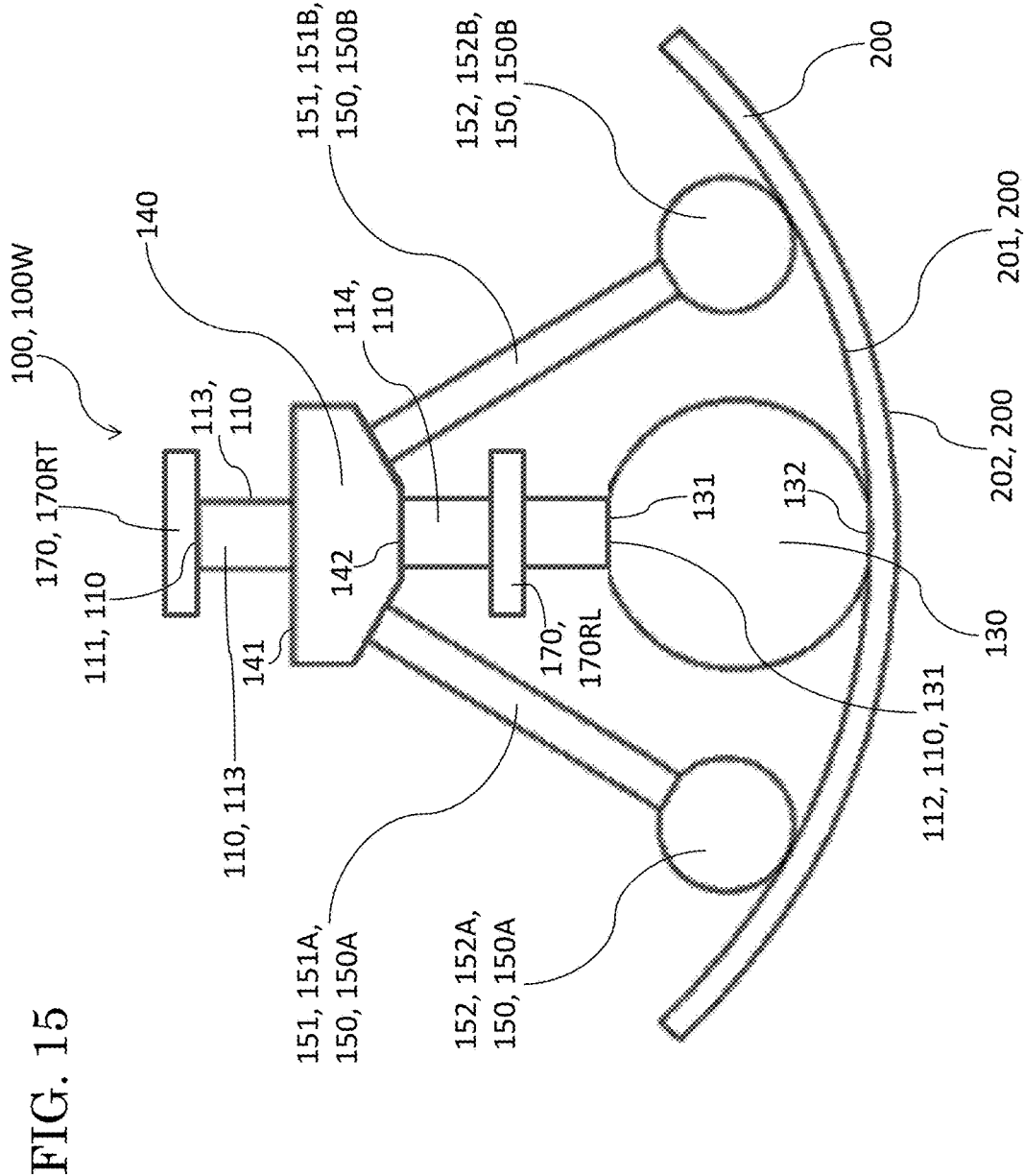
Figure 16:
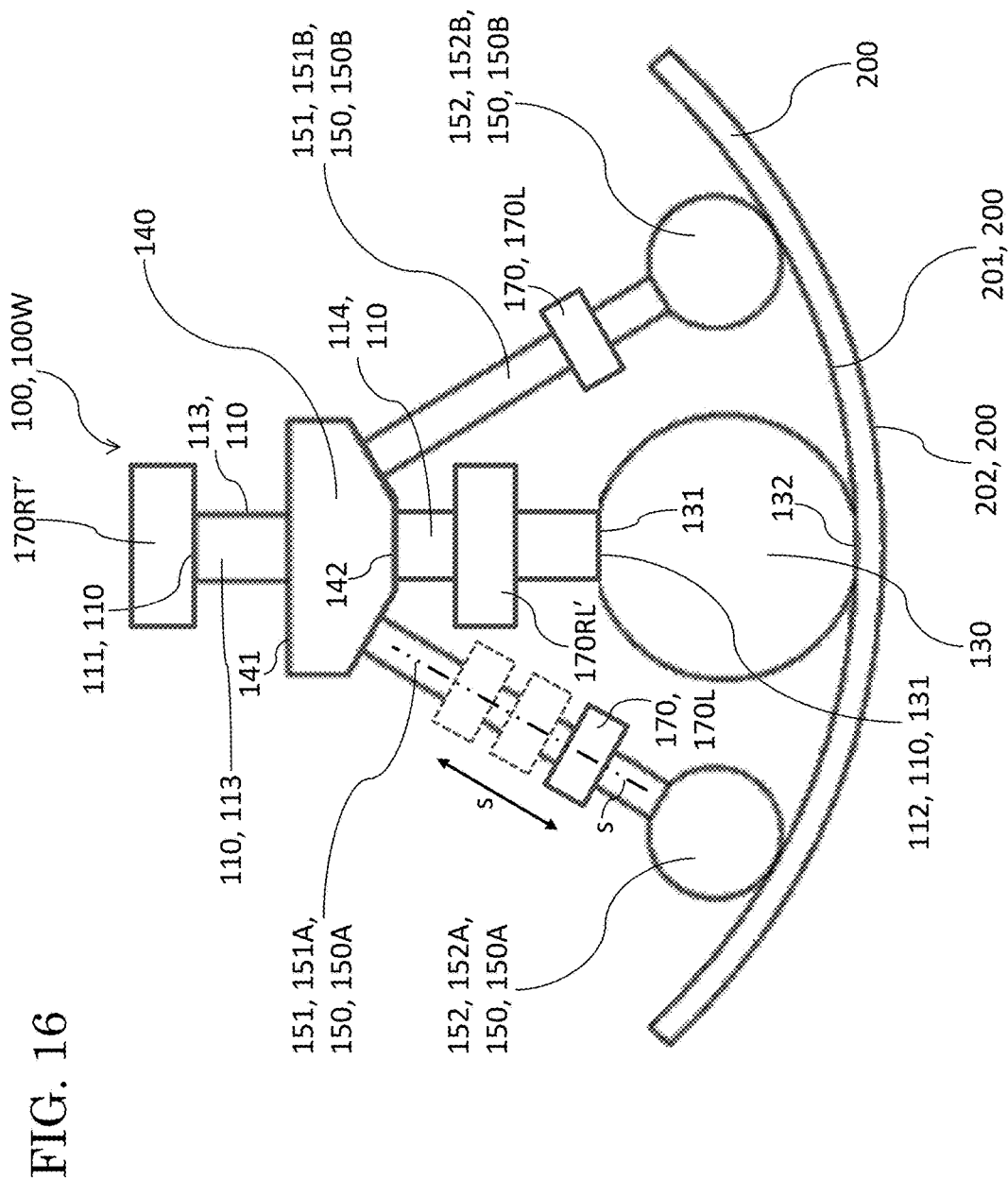
Figure 17:
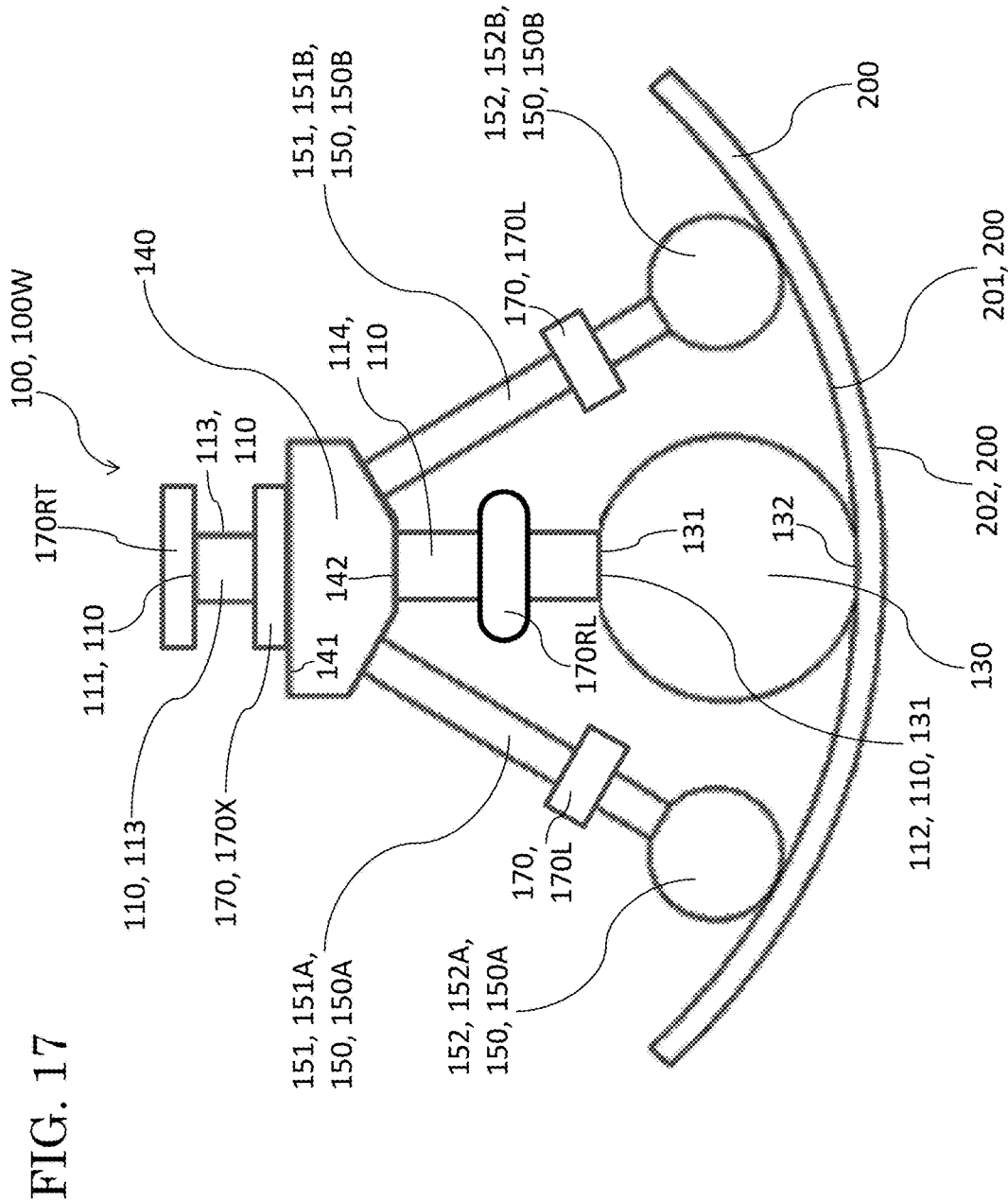

As shown by way of example in FIGS. 11 and 12, weight 170R can be a solid cylindrical weight (e.g., a solid disk or disk-like short solid cylindroid) such as weight 170RT attached atop vertical rod 110, e.g., adjoining rod upper-end 111. FIG. 13 shows an example wherein weight 170R is an annular weight 170RL (e.g., a collar or ring or short hollow cylindroid) designed to fit around a shaft or other elongate cylindrical object) attached at a selected location along the vertical axial length of rod 110. FIGS. 14 and 15 illustrate possible inventive embodiments whereby one or plural solid cylinder weights 170RT and/or one or plural annulus weights 170RL are associated with vertical rod 110, and/or one or more of the weights 170R are vertically adjustable bi-directionally along axis a.

Figure 18:
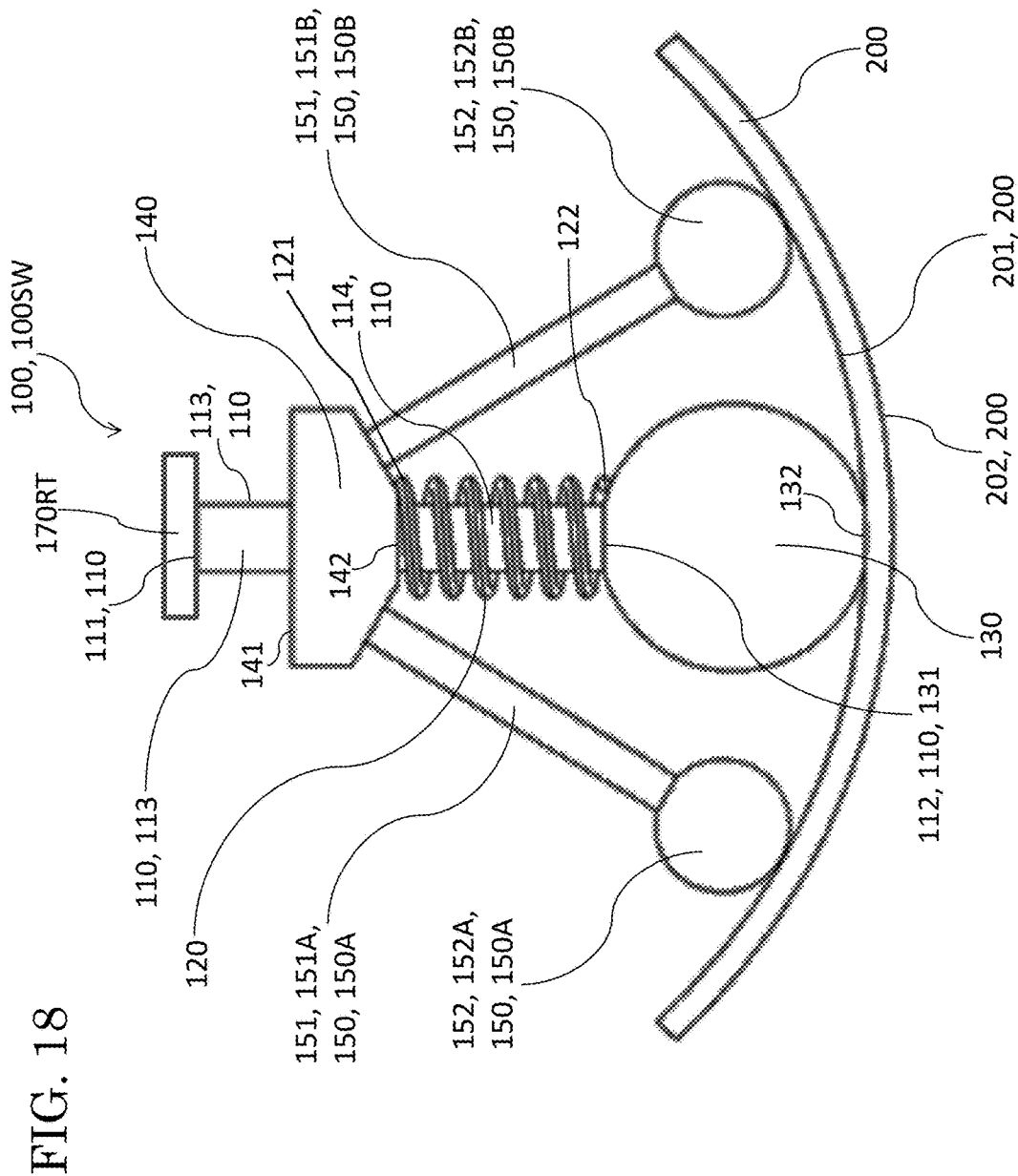
FIG. 18 is an elevation view, similar to the views of FIGS. 1, 11, and 13 through 17, of another embodiment of a laser target carrier in accordance with the present invention.
Figure 19:
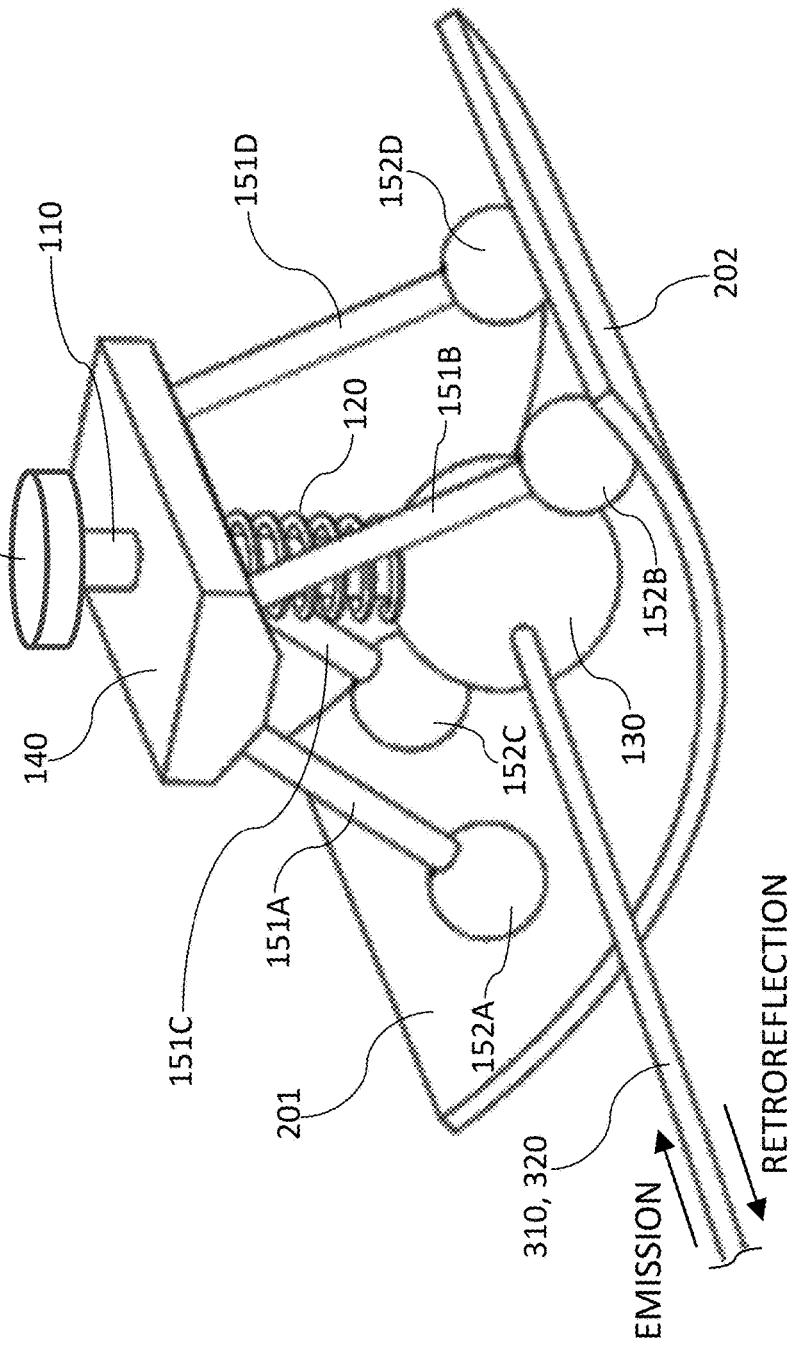
FIG. 19 is a perspective view, similar to the views of FIGS. 3 and 12, of the inventive carrier and accompanying retroreflective target shown in FIG. 18.
Figure 20:
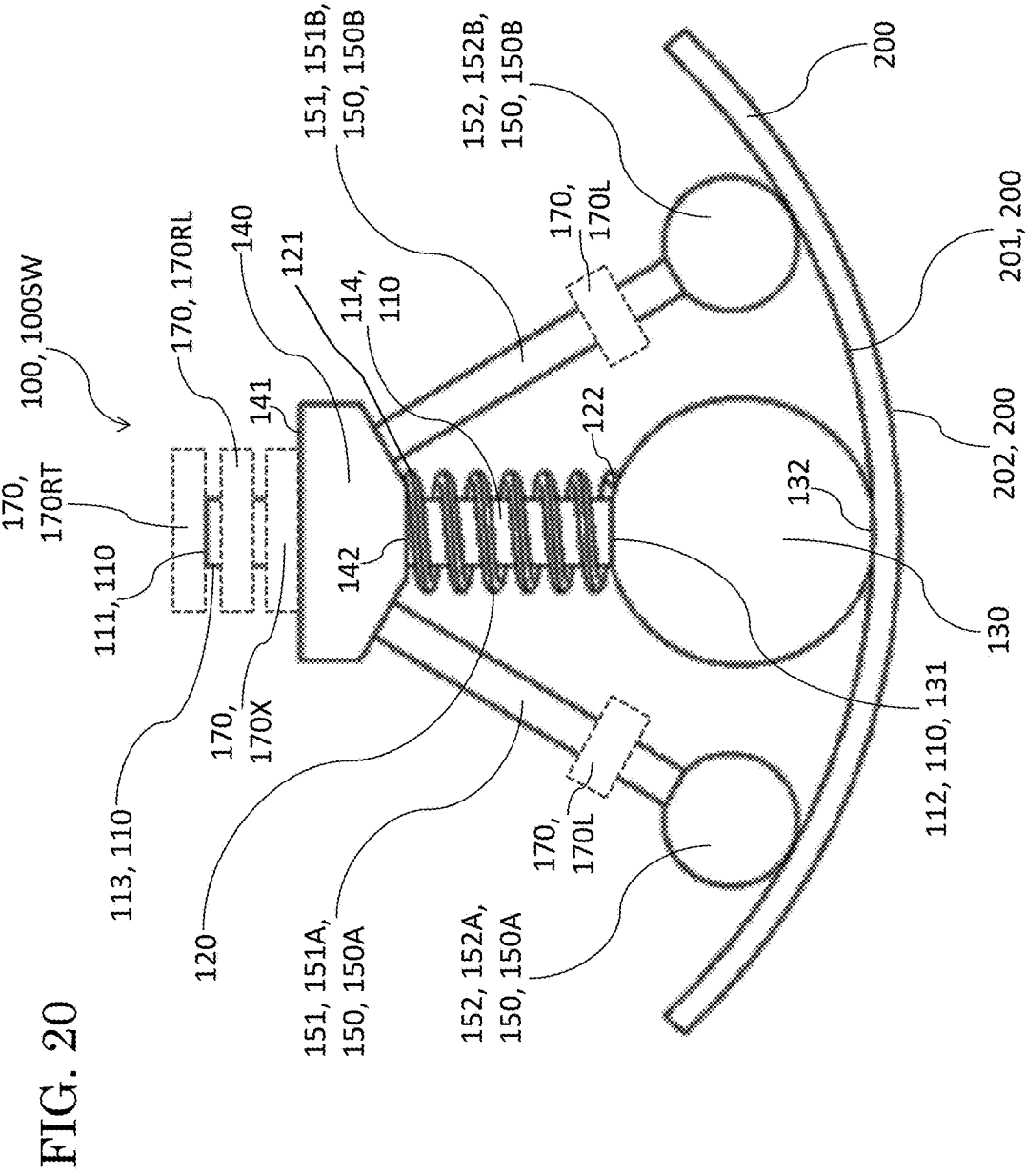
FIG. 20 is an elevation view, similar to the views of FIGS. 1, 11, and 13 through 18, illustrative of various possible ways and configurations of combining spring-loading with weight-loading in accordance with the present invention.

Inventive implementation is possible of both a top disk weight 170RT (such as shown in FIGS. 11 and 12) and at least one collar weight 170RL along the length of rod 110, above and/or below body 140. As another example, a weight-loaded inventive device 100W can be embodied whereby the only source of weight-loading is from one or more leg weights 170L, such as cylindrical weights 170L shown in FIGS. 8, 16, 17, and twenty. FIGS. 18 through 20 illustrate various inventive combinations of a spring 120 with one, two, or all three types of weight 170 (170R, 170L, 170X). Spring 120 can be combined with one or more of any weight 170 type. However, according to usual inventive practice, no weight 170RL is placed between body 140 and retroreflective object (e.g., SMR) 130 when a spring 120 is used.

Some inventive embodiments provide for adjustability of one or more weights 170R. For example, one or more rod length weights 170RL can be moved (e.g., adjusted) up or down in an axial-longitudinal direction such as along rod axis a. Additionally or alternatively, one or more leg weights 170L can be moved (e.g., adjusted) up or down in an axial-longitudinal direction such as along leg axis s. Sizes, shapes and densities can vary, depending on the inventive embodiment. An inventive device 100W or 100SW can be embodied to provide for switching of weights to different sizes and/or shapes and/or weight magnitudes and/or densities. As another example, the weight of a vertical rod 110 can be adjusted by replacing congruent vertical rods 110 of different materials having different densities.

Figure 21:
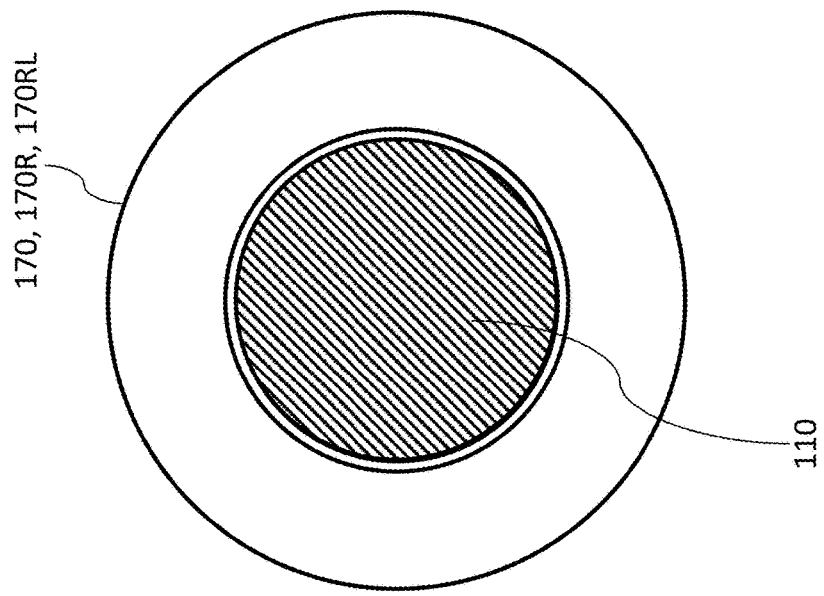
FIG. 21 is a plan view of an example of a solid weight suitable for implementation atop a vertical rod in accordance with the present invention. The vertical rod is shown as a circular dashed line beneath the solid weight if conceived to be transparent.
Figure 22:
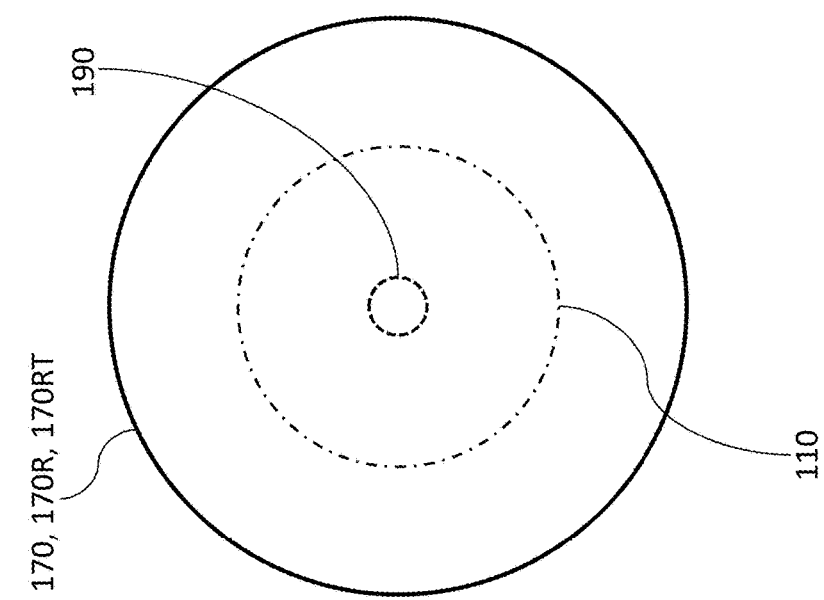
FIG. 22 is a plan view of an example of an annular weight suitable for implementation at a location along the length of a vertical rod in accordance with the present invention.
Figure 24:
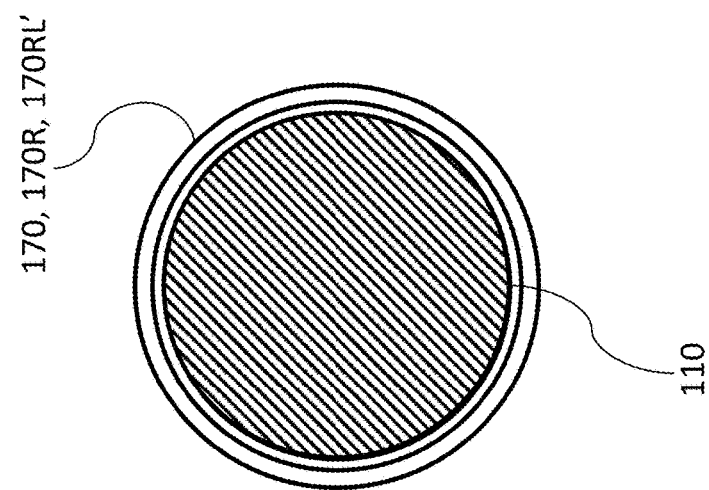
FIG. 24 is a plan view similar to the view of FIG. 22. The annular weight shown in FIG. 24 has a smaller diameter than has the annular weight shown in FIG. 22.
Figure 23:
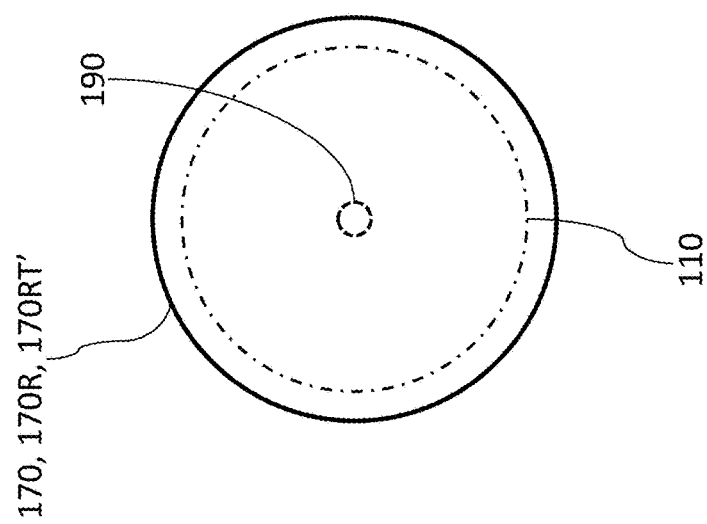
FIG. 23 is a plan view similar to the view of FIG. 21. The solid weight shown in FIG. 23 has a smaller diameter than has the solid weight shown in FIG. 21.

Different diameters of solid cylindrical weight 170RT are illustrated by weights 170RT and 170RT' in in FIGS. 21 and 23, respectively. Different diameters of annular weight 170RL are illustrated by weights 170RL and 170RL' in in FIGS. 22 and 24, respectively. Different axial lengths of solid cylindrical weight 170RT are illustrated by weights 170RT and 170RT' in in FIGS. 15 and 16, respectively. Different axial lengths of annular weight 170RL are illustrated by weights 170RL and 170RL' in in FIGS. 15 and 16, respectively. Different diameters of annular weight 170RL are illustrated by weights 170RL and 170RL' in in FIGS. 15 and 16, respectively. According to some inventive embodiments, solid weights 170RT and/or annular weights 170RL and/or annular weights 170L of same or similar or dissimilar characteristics can be added or subtracted.

It is to be emphasized that, although weights 170 are portrayed as cylindrical in some of the figures, inventive practice is possible wherein one or more weights 170 has a curved or curvilinear shape that is axially-symmetrical but does not define a geometric cylinder. Examples of geometric three-dimensional shapes suitable for inventive practice of a weight 170 include but are not limited to cylindrical (e.g., disk-shaped), spherical, toroidal, ellipsoidal, prolate spheroidal, oblate spheroidal, or rounded cylindrical (e.g., rounded disk-shaped). A cylinder having a flattened or short-axial character is also referred to herein as a disk. A non-cylindrical weight 170RL is shown by way of example in FIG. 17.

According to frequent inventive practice, each weight 170—whether it be solid rod-top weight 170RT, or annular rod-length weight 170RL, or leg weight 170L—is characterized by axial symmetry and uniform density. A weight can be made of, for instance, a metal, plastic, or composite material. Each weight 170 is associated with the inventive device 100W so that the longitudinal axis characterizing weight 170 is aligned with or coincident with the longitudinal axis characterizing the elongate component of the inventive device 100. For instance, a solid rod-top weight 170RT axially aligns with longitudinal axis a of rod 110. An annular rod-length weight 170RL axially coincides with longitudinal axis a of rod 110. An annular leg-length weight 170L axially coincides with longitudinal axis s of leg 150.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A laser tracking system comprising a laser target assembly, said laser target assembly including a generally rectangular member, four legs, a shaft, at least one weight, and a retroreflective target, said generally rectangular member characterized by four corners and a central aperture extending therethrough, said shaft characterized by a shaft axis, said four legs each connected to said generally rectangular member at each corner of said rectangular member, said shaft passing through said central aperture, said retroreflective target connected to said shaft at an axial end of said shaft, said at least one weight connected to said shaft so that said shaft when in a vertical position exerts a downward force against said retroreflective target in the vertical axial direction of said shaft, wherein said laser target assembly is positionable upon a surface at each of plural locations of said surface whereby said legs and said retroreflective target are contiguous said surface, and wherein at each said location of said surface said retroreflective target is contiguous said surface in accordance with said downward force exerted by said at least one weight.

2. The laser tracking system of claim 1, wherein said laser target assembly further includes a coil spring, said coil spring circumscribing said shaft so as to exert respective tensile forces against said rectangular member and said retroreflective target, wherein at each said location of said surface said retroreflective target is contiguous said surface further in accordance with spring-loading associated with said coil spring.

3. The laser tracking system of claim 2, further comprising a laser tracker for emanating laser light striking said retroreflective target and for receiving laser light reflecting from said retroreflective target.

4. The laser tracking system of claim 1, wherein said shaft has a bottom said axial end and a top said axial end, said retroreflective target is connected to said shaft at said bottom axial end of said shaft, and a said weight is connected to said shaft at said top axial end of said shaft.

5. The laser tracking system of claim 1, wherein said shaft has a bottom said axial end and a top said axial end, said retroreflective target is connected to said shaft at said bottom axial end of said shaft, and a said weight is connected to said shaft at a location intermediate said bottom axial end and said top axial end of said shaft.

6. The laser tracking system of claim 5, wherein said weight connected to said shaft at said bottom axial end is an annulus encircling said shaft and sharing said shaft axis.

7. A carriage for an object, the carriage comprising:
a body having a vertical through-hole and a body bottom, said body characterized by a vertical longitudinal geometric plane;
four legs attached to said body at said body bottom, each said leg oriented at an oblique angle outward with respect to said vertical longitudinal geometric plane;
a vertical rod characterized by a vertical geometric axis and passing through said vertical through-hole so as to be moveable vertically up-and-down, said vertical rod having an upper rod end and a lower rod end, said vertical rod extending above and below said through-hole, said rod capable of attachment to an object at said lower rod end;
a weight characterized by said vertical geometric axis and attached to said vertical rod, said weight exerting downward loading upon an attached object in the direction of said vertical geometric axis.

8. The carriage of claim 7, wherein the carriage is positionable upon a surface whereby said legs and the attached said object contact said surface and whereby said downward loading is exerted by said weight upon the attached said object so that said object presses against a surface below the attached said object.

9. The carriage of claim 7, wherein the carriage further comprises a vertical spring characterized by said vertical geometric axis and encompassing said vertical rod, said vertical spring having an upper spring end and a lower spring end, said vertical spring pressing upon said body bottom at said upper spring end, said vertical spring pressing upon the attached said object at said lower spring end, said vertical spring exerting tension upon the attached said object in the direction of said vertical geometric axis.

10. The carriage of claim 9, wherein the carriage is positionable upon a surface whereby said legs and said object contact said surface and whereby said downward loading is exerted by said weight upon the attached said object and said tension is exerted by said vertical spring upon the attached said object so that said object presses against a surface below the attached said object.

11. The carriage of claim 7, wherein said weight is situated either:
- atop said vertical rod at said upper rod end; or
- at a location on said vertical rod that is between said lower rod end and said upper rod end, said weight distanced from said lower rod end and distanced from said upper rod end.

12. The carriage of claim 7 wherein said weight is a first said weight characterized by said vertical geometric axis and attached to said vertical rod, the carriage further comprising a second said weight characterized by said vertical geometric axis and attached to said vertical rod, each of the first said weight and the second said weight exerting downward loading upon the attached said object in the direction of said vertical geometric axis.

13. The carriage of claim 12 wherein:
- the first said weight is situated atop said vertical rod at said upper rod end;
- the second said weight is situated at a location on said vertical rod that is between said lower rod end and said upper rod end, the second said weight distanced from said lower rod end and distanced from said upper rod end.

14. The carriage of claim 7, wherein each said leg includes a straight stem and a spheroidal foot connected to said straight stem.

15. The carriage of claim 7, wherein said legs are attached to said body in a rectangular arrangement that is bisected by said horizontal geometric plane, and wherein said legs are each oriented outward at the same said oblique angle with respect to said horizontal geometric plane.

16. The carriage of claim 7, wherein at said bottom rod end said rod is magnetically attractive for effecting said attachment to said object at said lower rod end.

17. A laser target device for use in association with a laser tracking apparatus, the laser target device comprising:
- a body having a vertical through-hole and a body bottom, said body characterized by a vertical longitudinal geometric plane;
- four legs attached to said body at said body bottom, each said leg oriented at an oblique angle outward with respect to said vertical longitudinal geometric plane;
- a vertical rod characterized by a vertical geometric axis and passing through said vertical through-hole so as to be moveable vertically up-and-down, said vertical rod having an upper rod end and a lower rod end, said vertical rod extending above and below said through-hole;
- a retroreflective target for receiving a laser beam from a laser tracking apparatus, said retroreflective target attached to said rod at said bottom rod end;
- a weight characterized by said vertical geometric axis and attached to said vertical rod, said weight exerting downward loading upon an attached said object in the direction of said vertical geometric axis.

18. The laser target device of claim 17, wherein the laser target device is positionable upon a surface whereby said legs and said retroreflective target contact said surface and whereby said downward loading is exerted by said weight upon said retroreflective target so that said retroreflective target presses against a surface below said retroreflective target.

19. The laser target device of claim 17, wherein the laser target device further comprises a vertical spring characterized by said vertical geometric axis and encompassing said vertical rod, said vertical spring having an upper spring end and a lower spring end, said vertical spring pressing upon said body bottom at said upper spring end, said vertical spring pressing upon said retroreflective target at said lower spring end, said vertical spring exerting tension upon the attached said retroreflective target in the direction of said vertical geometric axis.

20. The laser target device of claim 9, wherein the laser target device is positionable upon a surface whereby said legs and said retroreflective target contact said surface and whereby said downward loading is exerted by said weight upon said retroreflective target and said tension is exerted by said vertical spring upon said retroreflective target so that said retroreflective target presses against a surface below said retroreflective target.

* * * * *